United States Patent
Vander Aa et al.

(10) Patent No.: US 10,853,712 B2
(45) Date of Patent: Dec. 1, 2020

(54) AUTHENTICATION METHOD OF A TWO DIMENSIONAL BAR CODE

(71) Applicant: AGFA NV, Mortsel (BE)

(72) Inventors: Joseph Vander Aa, Mortsel (BE); Fabienne Goethals, Mortsel (BE); Rene Geelen, Mortsel (BE)

(73) Assignee: AGFA NV, Mortsel (BE)

( * ) Notice: Subject to any disclaimer, the term of this patent is extended or adjusted under 35 U.S.C. 154(b) by 52 days.

(21) Appl. No.: 16/304,327

(22) PCT Filed: May 23, 2017

(86) PCT No.: PCT/EP2017/062390
§ 371 (c)(1),
(2) Date: Nov. 26, 2018

(87) PCT Pub. No.: WO2017/207344
PCT Pub. Date: Dec. 7, 2017

(65) Prior Publication Data
US 2019/0138867 A1    May 9, 2019

(30) Foreign Application Priority Data
May 31, 2016 (EP) .................................... 16172257

(51) Int. Cl.
*G06K 19/06* (2006.01)
*G06K 19/14* (2006.01)
(Continued)

(52) U.S. Cl.
CPC ... *G06K 19/06037* (2013.01); *G06K 19/0614* (2013.01); *G06K 19/06056* (2013.01);
(Continued)

(58) Field of Classification Search
CPC ... G06K 19/06037; G06K 7/14; G06K 7/1417
(Continued)

(56) References Cited

U.S. PATENT DOCUMENTS

| 4,423,415 A | 12/1983 | Goldman |
| 4,785,290 A | 11/1988 | Goldman |

(Continued)

FOREIGN PATENT DOCUMENTS

| EP | 1 239 413 A2 | 9/2002 |
| EP | 1 485 863 A2 | 12/2014 |

(Continued)

OTHER PUBLICATIONS

Official Communication issued in International Patent Application No. PCT/EP2017/062390, dated Aug. 22, 2017.

*Primary Examiner* — Ahshik Kim
(74) *Attorney, Agent, or Firm* — Stinson LLP

(57) ABSTRACT

A method of producing a 2D barcode on an article including a laser markable layer, wherein the 2D barcode includes a primary information pattern representing primary information, which can be read by a 2D-barcode-reader, and a secondary information pattern embedded within the 2D barcode, which is difficult to reproduce without alteration, includes a laser marking step of exposing the laser markable layer with an infrared laser thereby forming the secondary information pattern of the 2D barcode.

15 Claims, 1 Drawing Sheet

(51) Int. Cl.
*G06K 19/18* (2006.01)
*G06K 19/10* (2006.01)

(52) U.S. Cl.
CPC ........ *G06K 19/06112* (2013.01); *G06K 19/10* (2013.01); *G06K 19/14* (2013.01); *G06K 19/18* (2013.01)

(58) Field of Classification Search
USPC .......................................................... 235/494
See application file for complete search history.

(56) References Cited

U.S. PATENT DOCUMENTS

| | | |
|---|---|---|
| 6,398,117 B1 | 6/2002 | Oakeson et al. |
| 6,948,657 B2 | 9/2005 | Sugino et al. |
| 8,180,174 B2 | 5/2012 | Di Venuto et al. |
| 2006/0180673 A1* | 8/2006 | Finnerty ............... A63F 3/0685 235/491 |
| 2010/0025476 A1* | 2/2010 | Widzinski, Jr. ....... G09F 3/0294 235/488 |
| 2011/0127331 A1* | 6/2011 | Zhao .................. G06K 7/10544 235/462.01 |
| 2014/0131458 A1 | 5/2014 | Picard et al. |
| 2016/0074865 A1 | 3/2016 | Rao et al. |
| 2016/0267369 A1* | 9/2016 | Picard ................. G06K 7/1417 |

FOREIGN PATENT DOCUMENTS

| | | |
|---|---|---|
| WO | 2008/003964 A2 | 1/2008 |
| WO | 2010034897 A1 | 4/2010 |
| WO | 2013/012794 A2 | 1/2013 |
| WO | 2015/067725 A1 | 5/2015 |

\* cited by examiner

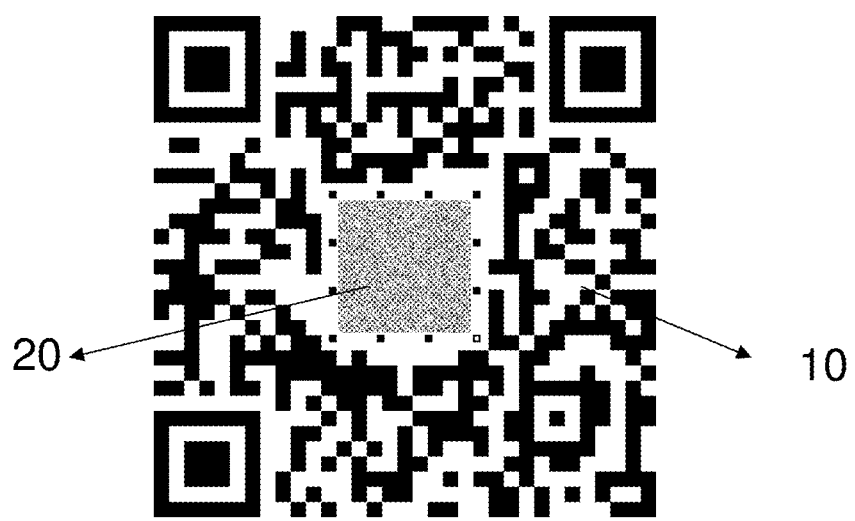

AUTHENTICATION METHOD OF A TWO DIMENSIONAL BAR CODE

CROSS REFERENCE TO RELATED APPLICATIONS

This application is a 371 National Stage Application of PCT/EP2017/062390, filed May 23, 2017. This application claims the benefit of European Application No. 16172257.4, filed May 31, 2016, which is incorporated by reference herein in its entirety.

BACKGROUND OF THE INVENTION

1. Field of the Invention

The present invention relates to a method for preparing a two dimensional bar code using laser marking and to method of authentication of the prepared barcode.

2. Description of the Related Art

Serialization and authentication becomes more and more important in the manufacturing of packaging, especially in for example pharmaceutical packaging and packaging of luxury goods.

Serialization and authentication refers to the assignment and placement of unique markings on a primary package. Such unique markings include human-readable letter/number codes, machine readable codes or RF-ID tags.

2D barcodes are data carriers often used to assign a unique identification or code to a product, document or any other item. Such 2D barcodes are preferably formed by a two-dimensional grid defining a 2D matrix whose cells are coded with information, notably binary information.

Compared to one dimensional (1D) codes, two-dimensional (2D) codes can contain much more information. Such 2D barcodes are typically used for serialization or so-called track and trace purposes. Unique codes of a product are placed on the product or its package when they are packaged. These unique codes are then uploaded to a database and coupled to information such as batch number, production date, or even instructions how to use the product. That information can be assessed by various parties after the packaged product is shipped and sold by reading the code with a 2D barcode reader whereupon the code is converted to a useful form, for example a standard URL for a website, thereby obviating the need for a user to type it into a web browser. When using a real-time database the information provided to customers can be updated after shipping the packaging to that customer. Also, by consulting the databank, information of the customer, for example his location, may be entered into that databank and provide the supplier with valuable marketing information.

The most common 2D barcodes used today in industry are the QR Code (Quick Response Code) and the Data Matrix code.

The QR code system became popular due to its fast readability and its high storage capacity.

A QR code consists of black and white elementary cells, also called "modules" arranged in a square grid. These elementary cells form the primary information pattern referred to in this application.

A QR code can be read by an imaging device, such as a camera or a scanner, and then analysed using a programmed processor. The processor locates the three distinctive squares at the corners of the QR code image, using a smaller square (or multiple squares) near the fourth corner to normalize the image for size, orientation, and angle of viewing. The small dots throughout the QR code are then converted to binary numbers and validated with an error-correcting code. The information contained in the QR code can be used to trace a product in a distribution channel, or to detect frauds related to product, such as diversion, theft, alteration, or counterfeiting. However, even though 2D barcodes are increasingly used for anti-counterfeiting applications, they have no built-in protection against copying. They can therefore be very easily duplicated and applied to non-legitimate items, i.e. to counterfeits.

To enhance security, barcodes used for anti-counterfeiting may be complemented by a variety of physical security elements, generally extrinsic from the 2D barcode (i.e. outside the 2D-barcode), such as holograms, special inks or taggants which can be revealed with a specific detection device (ink with specific spectral properties revealed when illuminated with a certain spectrum), microprints, etc. However, all such methods are known to be either expensive or inconvenient to integrate in production processes. In addition, they are inconvenient to verify, and easy to copy or imitate.

Also methods have been proposed wherein security elements are placed intrinsically to the 2D bar code itself (i.e. inside the 2D barcode) and forming so-called secondary information with respect to primary information used for coding an identity or message. Such methods have been disclosed in for example EP-A 1239413, EP-A 1485863 or U.S. Pat. No. 6,398,117, WO2013/012794, WO2008003964, WO2010034897, U.S. Pat. Nos. 4,423,415, 4,785,290, 6,948,657 or 8,180,174.

In many of these documents, the secondary information is spread over the whole surface of the primary information, for example as a watermark. These techniques have drawbacks. The information is in many cases hidden to the counterfeiter. However, hidden secondary information may be less secure compared to visible secondary information, because it has a weak signal to noise ratio to ensure imperceptibility, and is therefore easier for an informed counterfeiter to replicate.

Moreover, embedding hidden secondary information within the primary information may have an impact on the readability of the first information which may be distorted by the presence of the secondary information. In addition, the presence of secondary information such as a Digital Authentication Code (DAC) into a 2D barcode as discloses in WO2010/034897, requires complex algorithms for embedding and decoding the information contained in the secondary information, which makes the management of the authentication system cumbersome and less reliable, whereas 2D bar code containing only primary information are designed to be extremely quick and easy to decode.

The most important disadvantage of conventional 2D barcodes containing primary and secondary information lies in the fact that the secondary information is more complicated to read than the primary information. A lot of these techniques do not allow to automatically authenticate the 2D barcode with the secondary information without using a specific process or device.

WO2015/067725 discloses a method to produce 2D barcodes which are secure against copying, while keeping good readability of the primary information. WO2015/067725 also discloses a method to authenticate the barcodes wherein the process of authentication is as simple as reading the 2D barcode with a mobile device. The 2D barcode comprises primary information, which can be read by a 2D-barcodereader, and secondary information in a visible pattern embedded in the barcode. The secondary information in a visible pattern consists of light and dark elementary sub-cells smaller than 50 μm and is configured to be difficult to reproduce without alteration. The primary and secondary information may be printed by inkjet printing or offset printing.

However, as reproduction means used by counterfeiters continue to improve, there remains a need to further develop 2D barcodes that are more difficult of being reproduced by such counterfeiters, and wherein the authentication may be performed with the same apparatus used to read the primary information, in particular a mobile phone.

SUMMARY OF THE INVENTION

Preferred embodiments of the invention provide a method of producing a 2D barcode, which is difficult to be reproduced.

The advantages and benefits of the present invention are realized by the method of producing a 2D barcode described below.

Other preferred embodiments of the invention provide a method to authenticate an article with a mobile phone.

These advantages and benefits are realized by the authentication method described below.

Further advantages and embodiments of the present invention will become apparent from the following description.

BRIEF DESCRIPTION OF THE DRAWINGS

FIG. 1 shows a schematic representation of an embodiment of a 2D barcode according to the invention.

DETAILED DESCRIPTION OF THE PREFERRED EMBODIMENTS

Definitions

The term "monofunctional" in e.g. monofunctional polymerizable compound means that the polymerizable compound includes one polymerizable group.

The term "difunctional" in e.g. difunctional polymerizable compound means that the polymerizable compound includes two polymerizable groups.

The term "polyfunctional" in e.g. polyfunctional polymerizable compound means that the polymerizable compound includes more than two polymerizable groups.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2Dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group.

Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms.

Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, ether, thio-ether, ketone, aldehyde, sulfoxide, sulfone, sulfonate ester, sulphonamide, —Cl, —Br, —I, —OH, —SH, —CN and —NO$_2$.

An offset ink is a coloured ink designed for offset printing.

An offset varnish is a colourless ink designed for offset printing.

A dispersion-lacquer is an aqueous lacquer used in an in-line coating unit of an offset printing press, for example for embellishment or (UV) protection purposes.

Method of Producing a 2D Barcode

The method of producing a 2D barcode (1) on an article comprising a laser markable layer, the 2D barcode comprising a primary information pattern (10) representing primary information, which can be read by a 2D-barcode-reader, and a secondary information pattern (20) embedded within the 2D barcode, which is difficult to reproduce without alteration, includes a laser marking step of exposing the laser markable layer with an infrared laser thereby forming the secondary information pattern of the 2D barcode.

A two-dimensional (2D) barcode is also referred to as a matrix barcode. Preferred 2D barcodes are QR codes (Quick Response Code) and Data Matrix codes, a QR code being particularly preferred.

The primary information typically relates to information about a product, such as bath number, production date, etc. The primary information pattern has a format in conformity with 2D barcode standards, making the information retrievable with a conventional barcode-reader.

The secondary information pattern, which is difficult to reproduce without alteration, may be used to authenticate the 2D barcode in an authentication method. Secondary information relates to information which is aimed to validate the authenticity of the 2D barcode and is more difficult to reproduce than primary information without alteration. Secondary information therefore does not necessarily need to contain any information about the product or document on which the 2D barcode is placed, but may be entirely directed on providing counterfeit detection means. Therefore, secondary information is not information like the primary information, in the sense that from the decoder perspective, no information has to be decoded, but a similarity with an original pattern has to be measured.

The secondary information pattern is a pattern of so called elementary sub-cells (see below) forming a so-called "fingerprint", whereby the elementary sub-cells are sufficiently small to prevent the reproduction of the pattern without introducing errors. The copying (scanning) of an originally printed pattern of elementary sub-cells representing the secondary information, followed by the visual reproduction (e.g. printing or representation on screen) thus leads to an alteration of the fingerprint that can be detected by various means, for example by comparison of the fingerprint with a secondary information generation file or by comparison with an image corresponding to a scan or scans of original prints of the secondary information.

The secondary information pattern may be randomly generated, for example by using a randomly or pseudo-randomly generated key that is kept secret. Without knowing the key, the secondary information pattern cannot be re-generated, for example by a counterfeiter. The counterfeiter only has access to the printed original which cannot be copied and reproduced without some detectable alteration.

Reproduction of the 2D barcode, more specifically reproduction of the secondary information pattern, referred to may be performed by any reproduction or copying technique, for example by scanning the 2D barcode with a high quality scanner and then printing the scanned 2D barcode on another packaging by any known printing technique.

The primary information pattern may be read by any conventional 2D-barcode-reader. Preferably, the conventional 2D-barcode-reader is part of a mobile device, such as a tablet or a smart phone.

Laser marking referred to means marking of information by means of a laser. To become laser markable, or to improve the laser marking properties, a packaging is preferably provided with a laser markable layer. In contrast to laser engraving, laser marking does not substantially alter the laser markable layer.

The secondary information pattern of the 2D barcode is formed by laser marking in such a way that upon reproduction, the pattern will be "degraded", i.e. will be different compared with the original pattern. Detecting such a difference in an authentication step indicates that the 2D barcode is not the original one and that the product in the packaging is also not the original product, i.e. a counterfeited product. The expression "difficult to reproduce without alteration" means that most copying machines, scanners, image capture devices or printers are not able to copy, capture or reproduce the 2D barcode without altering the visible pattern, which renders the secondary information systematically non readable or non-correctly readable after scanning or copying of the original printed visible pattern. For example, the original printed visible pattern of the original 2D barcode may contain fine details which cannot survive copying. Authentication is then based on scanning and analysing visible pattern details which are more numerous for original 2D-barcodes than for non-original 2D barcodes. The expression "difficult to reproduce without alteration" thus means that the secondary information is deteriorated when copied and reproduced resulting in loss of "information", which is characteristic or original in the secondary information.

The primary information pattern may be reproduced without any substantial alteration.

Preferably, the primary information pattern is also formed in the laser marking step.

The primary information pattern (10) is formed by a specific arrangement of elementary cells. These elementary cells have a size allowing a reproduction without or with minor alteration. A reproduced primary information pattern may thus be decoded correctly. The size of the elementary cells may range between 0.05 and 3 mm, preferably between 0.1 and 2 mm, more preferably between 0.2 and 1 mm, most preferably between 0.3 and 0.5 mm.

The secondary information pattern (20) is formed by a specific arrangement of elementary sub-cells. These elementary sub-cells are preferably smaller compared to the elementary cells of the primary information pattern. The size or diameter of the elementary sub-cells is preferably less than 50 µm, more preferably less than 35 µm, most preferably less than 20 nm, particularly preferred less than 10 µm.

Particularly preferred 2D barcodes comprising a primary information pattern representing primary information, which can be read by a 2D-barcode-reader, and secondary information embedded within the 2D barcode, which are difficult to reproduce without alteration are disclosed in WO2015/06/0677, paragraphs [0044] to [0075].

According to a preferred embodiment, the secondary information pattern is as disclosed in WO2015/067725 [0035]-[0038].

In a preferred embodiment, the visible pattern contains a so called "signature", which can be verified locally by a device directly connected to a barcode reader to check the authenticity of the barcode. The "signature" is a specific part of the secondary information, which can be locally controlled, forming thereby secondary information of a first security level. Such a signature constitutes a simple way to verify that the 2D barcode is an original one by comparing the decoded signature of the 2D barcode to be checked with a reference (signature key), which may be locally available, for example in a smartphone, which is used as barcode reader or any other device used as barcode reader or containing a barcode reader, in particular a mobile device directly connected to the barcode reader, to give an indication about the presence of the right signature or a wrong signature on the 2D barcode, thereby giving an indication about the original character or the non-original character of the 2D bar-code.

For example, a pseudo randomly generated first key K1 (or "signature key") may be used for all 2D-barcodes and may be available for the mobile device. A reconstitution of the "source signature" may be preferably performed using the first key K1 and part of the primary information contained in the 2D barcode (for example a unique ID present in the primary information pattern) by means of a first algorithm running on the mobile device. The first security level authentication check consists of the comparison between the signature of the 2D barcode to be checked and said source signature (said "comparison" being for example an image similarity calculation producing a score and a comparison of that score to a threshold). The first security authentication check can be advantageous when the authentication device is not connected to the Internet.

Another significant advantage of the signature is the possibility to verify locally whether the scan has appropriate image quality by performing measurement on the signature. For example, if for consecutive frames the measurement is stable and consistent, this can be an indication that those frames are usable for authentication and can be sent to a remote server for full authentication.

In another preferred embodiment, to further enhance the security level of authentication, in addition or alternative to a signature, which can be verified locally, the visible pattern contains a signature, which authenticity can be verified only by a remote device, such a signature also referred hereinafter as "a secret". Therefore, a "secret" is secondary information, which can only be remotely controlled, forming thereby secondary information of second security level (second security level being of higher level than first security level).

Such a secret forms an additional security element, formed by an image portion of the visible pattern, i.e. a unique pattern (unique noise pattern), here randomly generated, which is compared with a reference (secret key) that may be only available in a remote equipment (for instance the secret key is part of a database present in a remote server).

This situation requiring an information exchange between the 2D barcode-reader and the remote server, only people having access to the remote server can use this remote authentication procedure. Also, having the secret key recorded in a remote server allows using hidden and hardly accessible information within the secret. For instance, the secret key is part of a remotely stored list of original secrets. For instance second keys (or "secret keys") K2, K2' . . . , different for each barcode or for each 5 series of 2D-barcodes, are present only in the remote server (secure database), they are preferably generated truly randomly (but also can be pseudo randomly generated or partially truly randomly/partially pseudo randomly generated). The reconstitution of source secret is made from second key K2 only present in the remote server through a second algorithm (optionally, said reconstitution of source secret also uses a part of 2D code message, i.e. primary information (for instance unique ID)). Said second algorithm can be present anywhere including said mobile device or said remote server. Therefore, the second security level authentication check is implemented by comparison between the secret of the 2D barcode to be checked and said source secret. As an alternative to the use of said second key K2, the source secret, i.e. the pattern, is stored in the remote server, so that a comparison is directly done between said source secret and said secret of the 2D barcode to be checked. Said "comparison" being for example an image similarity calculation producing a score and a comparison of that score to a threshold. It may be noted that the signature can be checked in further details and with more accuracy in the remote device, by comparison to more reference information such as reference scans of original prints and thresholds based thereon that are stored in the remote device.

Advantageously, said secret can be reconstituted using a secret key (K2) present only in said remote device. Such secret is a second data portion which forms an additional portion of the fingerprint (visible pattern), and which enhances security level of authentication of 2D barcode: pseudo-randomly generated data of the second data portion form data which can only be retrieved with a complex routine (program operations). Whenever for instance such second data portion can be retrieved from at least primary information, secondary information is only correctly accessible when primary information has beforehand correctly been decoded. Also, according to another more secure alternative, when second data portion can only be retrieved from both primary information and a randomly generated first data portion of said signature, secondary information is only correctly accessible when both primary information and first data portion, i.e. signature, have beforehand correctly been decoded or matched to a source. In addition, said visible pattern may contain only a signature, only a secret or both a signature and a secret. The zones where the signature and the secret are coded may be physically separated or not. The portion of this visible pattern (secondary information) formed by a signature, a secret or both a signature and a secret, can be considered technically as a fingerprint.

Preferred embodiment of a 2D barcode is disclosed in WO2015/067725 paragraphs [0044] to [0075].

Authentication Method.

The method of authenticating a packaging comprises the steps of:
  producing a 2D barcode on an packaging,
  reading the 2D-barcode with a 2D-barcode-reader,
  identifying within the secondary information of the 2D barcode-reader a signature thereby forming a detected signature,
  comparing the detected signature to a signature key and determining as a result of the comparison a signature similarity score,
  comparing the signature similarity score to a predetermined signature threshold;
  establishing an authentication signature result being success if said result is equal to or more than said predetermined signature threshold or being failure if said result is less than said predetermined signature threshold.

Preferably, the 2D-barcode-reader is part of a mobile device.

In a preferred embodiment of the authentication method, the signature key is stored on a mobile device.

In another preferred embodiment of the authentication method, the mobile device is connected to a remote device on which the signature key is stored, and wherein the authentication signature result is established on the remote device and sent back the mobile device.

Other preferred embodiments of the authentication method are disclosed in WO2015/067725 paragraphs [0076] to [00109].

Laser Marking

In principle any infrared laser may be used in the laser marking step, as long that the obtained secondary information pattern is difficult of being reproduced.

The infrared laser may be a continuous wave or a pulsed laser.

For example a $CO_2$ laser, a continuous wave, high power infrared laser having an emission wavelength of typically 10600 nm (10.6 micrometer) may be used.

A disadvantage of such a $CO_2$ laser is the rather long emission wavelength, limiting the resolution of the laser marked secondary information pattern.

As reproduction of the secondary information pattern may become more difficult when the resolution of the pattern increases, it is preferred to use a near infrared (NIR) laser having an emission wavelength between 800 and 2000, preferably between 850 and 1200 nm in the laser marking step.

A particularly preferred NIR laser is an optical pumped semiconductor laser. Optically pumped semiconductor lasers have the advantage of unique wavelength flexibility, different from any other solid-state based laser. The output wavelength can be set anywhere between about 920 nm and about 1150 nm. This allows a perfect match between the laser emission wavelength and the absorption maximum of an optothermal converting agent present in the laser markable layer.

A preferred pulsed laser is a solid state Q-switched laser. Q-switching is a technique by which a laser can be made to produce a pulsed output beam. The technique allows the production of light pulses with extremely high peak power, much higher than would be produced by the same laser if it were operating in a continuous wave (constant output) mode, Q-switching leads to much lower pulse repetition rates, much higher pulse energies, and much longer pulse durations.

Using a laser marking step to produce the secondary information pattern instead of a conventional printing technique such as offset printing or inkjet printing, as disclosed in WO2015/067725 results in several advantages such as a higher resolution and the possibility to produce multiple gray levels.

A higher resolution of the secondary information pattern may be obtained because a laser, in combination with a XY-addressable system (for example a galvo-system), can have an addressability of 14000 dots per inch (dpi) or even higher. 14000 dpi correspond with a dot or pixel size of 1.8 µm.

As laser marking is a continuous tone (contone) imaging technique, the density of a single dot on a material can be varied quasi-continuously by changing the laser power. Therefore, there is no need to sacrifice addressability in exchange for producing many gray levels. Offset and inkjet printing are binary techniques, i.e. are only able to produce white or black, or at best multi-level (2, 3, to 8 levels). These printing techniques therefore have to sacrifice addressability in order to be able to produce a multitude of gray levels. The possibility to produce elementary sub-cells having multiple gray levels makes it possible to increase the complexity of the secondary information pattern, rendering it even more difficult to reproduce without losing information.

The higher resolution and the possibility to produce multiple gray levels makes it possible to produce secondary information patterns, which are more difficult to be reproduced by conventional reproduction techniques. As the quality of such reproduction techniques used by counterfeiters continues to improve, it is important to improve anti-counterfeiting means, such as the 2D-barcode produced by the method according to the present invention.

Another advantage of using laser marking instead of conventional printing techniques such as inkjet printing or offset printing lies in the fact that a laser can penetrate inside the laser markable layer or even trough a transparent layer positioned on top of the laser markable layer and can therefore produce blackening or coloration inside the layer or a deeper laying layer. Offset and inkjet on the other hand can only print on the surface of materials. Therefore, the printed 2D barcode printed with offset or inkjet is more prone to damage compared to a 2D barcode formed inside a laser markable layer by laser marking. To protect a 2D barcode printed with inkjet of offset, a coating or varnish may be applied on the printed 2D barcode, however this means an extra complexity of the production process. So laser marking can produce information (text, images, security features) in sub-surface layers without need to add protection layers afterwards.

Laser marking has a much higher working-distance, meaning the free distance between the packaging and the front-end of the marking device, for example the lens of the laser. A typical working distance for a laser marking device is of the order of many centimetres, for example 15 cm. In inkjet printing, the throwing distance, i.e. distance between the printhead and the packaging, is in the order of millimetres, while offset printing is a contact printing technique. A larger working distance may be beneficial, for example to laser mark uneven packaging surfaces.

With laser marking, variable data may be applied on the packaging. Variable data may also be applied with inkjet printing, however not with offset printing.

Laser marking systems can be placed in line, in contrast to many conventional printing techniques, such as offset printing. Applying the 2D barcode directly on the packaging, instead of first applying the 2D barcode on a label and then applying the label on the packaging, allows to speed up the process, to reduce the complexity of the process and to reduce waste.

With laser marking it is also possible to mark 3D objects.

Another advantage of laser marking is the fact that no post-processing is necessary to fix the image, for example a UV or heat curing. This fact simplifies the process and broadens the application range, for example when using heat-sensitive materials on which a QR code should be applied.

No dust is generated with laser-marking, especially when using leuco dye technology, which is usually the case with carbonization or destructive formation of images (for example laser engraving) with high power laser systems. Next to that, no chemicals are released in the environment during the imaging process. This is especially of relevance for applications such as pharmaceutical packaging where the GMP (Good Manufacturing Principle) is especially important.

When two or more lasers are used to laser mark two or more laser markable composition to produce two or more different colours, as described above, the difference of the emission wavelengths of the two or more infrared laser is preferably at least 100 nm, more preferably at least 150 nm, most preferably at least 200 nm.

Laser marking may be carried in line in the packaging process, for example to include batch numbers, expiry dates, bar codes or QR codes.

Article

The article on which a 2D barcode is applied comprises a laser markable layer. The article may be a packaging, a document, a label, etc.

A preferred article is packaging. The laser markable layer may be applied directly on the packaging, referred to as the packaging substrate, or may be first applied on a label comprising a laser markable layer whereupon the label is then applied on the packaging substrate.

The label comprising the laser markable layer may also be first applied on the packaging whereupon laser marking is carried out on the applied label.

The laser markable layer is preferably applied directly on the packaging substrate.

There is no real limitation on the type of substrate used for the packaging. The substrates may have plastic, glass or metal surfaces or may have a surface containing cellulosic fibres, such as paper and card board. The substrate may be an unprimed substrate but may also be a primed substrate, for example to improve the adhesion of the laser markable layer to the substrate.

A preferred packaging is folded cardboard or corrugated cardboard laminated with paper. Such packaging is preferably used for cosmetics, pharmaceuticals, food or electronics.

The process of manufacturing a laser markable packaging is preferably used for high quality packaging of luxury goods, such as for example premium brand cosmetics.

Such premium brand cosmetics are prone to counterfeiting and therefore it is important that the packaging of these products includes security features that are not easily copied.

According to another embodiment, the process of manufacturing a laser markable packaging is used for pharmaceutical packaging.

For pharmaceutical packaging, track and trace requirements become more and more demanding to comply with the ever evolving legislation.

The laser markable layer on the packaging substrate is prepared by applying a laser markable composition on that substrate.

When the packaging is not white, it is preferred to first apply a white layer on the packaging, whereupon the laser markable layer is then provided. This to increase the contrast between the exposed and non-exposed primary cells or sub-cells of respectively the primary and secondary information pattern. The white layer then forms the "white" elementary cells of the primary information pattern and the "white" elementary sub-cells of the secondary sub-cells. The white layer may be optimized to improve the adhesion of the laser markable layer on the packaging. Such a white layer may then be referred as a white primer, as described below.

The laser markable composition, and the white layer or primer, may be provided onto the packaging substrate by co-extrusion or any conventional coating technique, such as dip coating, knife coating, extrusion coating, spin coating, spray coating, slide hopper coating and curtain coating.

Alternatively, the laser markable compositions and the primer may be provided onto the substrate by a printing method such as intaglio printing, screen printing, flexographic printing, offset printing, inkjet printing, gravure offset printing, tampon printing, etc.

To improve the daylight and/or weather resistance of the laser marked 2D barcode, it may be advantageous to provide a top coat on the laser markable compositions wherein the top coat may contain one or more UV absorbing compounds or one or more light stabilizing compounds, such as for example acid scavengers. The same UV absorbers or acid scavengers as used in the laser markable composition and disclosed below may be used in the additional layers.

It may also be advantageous to incorporate water barrier properties into the packaging to improve the stability of the laser marked image in high humid conditions, for example by incorporating one or more intermediate and/or top layers having such water barrier properties.

When one laser markable composition is used, one colour may be formed. The composition may be optimized, for example by selecting the proper leuco dye, in order to obtain a desired colour.

Multiple colours may be obtained by using two or more laser markable compositions, which are preferably applied on top of each other. For example a full colour image may be obtained by using three laser markable compositions forming a cyan or blue, a magenta or red and a yellow colour upon laser marking.

The two or more laser markable compositions preferably comprise an optothermal converting agent making it possible to selectively address the two or more laser markable compositions.

When using two or more laser markable compositions to form a colour image, the compositions preferably comprise an infrared absorbing dye as optothermal converting agent. An advantage of such infrared dyes compared to infrared absorbing pigments is their narrow absorption making a selective addressability of the compositions possible.

When two or more laser markable compositions are used, the absorption maxima of infrared dyes differ by at least 150 nm, more preferably by at least 200 nm, most preferably by at least 250 nm.

According to a preferred embodiment, a first laser markable composition contains a first infrared dye IR-1 having an absorption maximum in the infrared region $\lambda_{max}$(IR-1), a second laser markable composition contains a second infrared dye IR-2 having an absorption maximum in the infrared region $\lambda_{max}$(IR-2), and a third laser markable composition contains a third infrared dye IR-3 having an absorption maximum in the infrared region $\lambda_{max}$(IR-3), wherein the conditions a) and b) are fulfilled:
a) $\lambda_{max}$(IR-1)>$\lambda_{max}$(IR-2)>$\lambda_{max}$(IR-3); and
b) $\lambda_{max}$(IR-1)>1100 nm and $\lambda_{max}$(IR-3)<1000 nm.

In a particularly preferred embodiment the condition c) is also fulfilled:
c) $\lambda_{max}$(IR-2) differs by at least 60 nm from $\lambda_{max}$(IR-1) and $\lambda_{max}$(IR-3)

In another preferred embodiment $\lambda_{max}$(IR-3)≥830 nm and $\lambda_{max}$(IR-1)≥1125 nm.

White Primer

The white primer contains a white pigment. The white pigment may be an inorganic or an organic pigment.

The white pigment may be selected from titanium oxide, barium sulfate, silicon oxide, aluminium oxide, magnesium oxide, calcium carbonate, kaolin, or talc.

A preferred white pigment is titanium oxide.

Titanium oxide occurs in the crystalline forms of anatase type, rutile type and brookite type. The anatase type has a relatively low density and is easily ground into fine particles, while the rutile type has a relatively high refractive index, exhibiting a high covering power. Either one of these is usable in this invention. It is preferred to make the most possible use of characteristics and to make selections according to the use thereof. The use of the anatase type having a low density and a small particle size can achieve superior dispersion stability, ink storage stability and ejectability. At least two different crystalline forms may be used in combination. The combined use of the anatase type and the rutile type which exhibits a high colouring power can reduce the total amount of titanium oxide, leading to improved storage stability and ejection performance of ink.

For surface treatment of the titanium oxide, an aqueous treatment or a gas phase treatment is applied, and an alumina-silica treating agent is usually employed. Untreated-, alumina treated- or alumina-silica treated-titanium oxide are employable.

The volume average particle size of the white pigment is preferably between 0.03 µm and 0.8 µm, more preferably between 0.15 µm and 0.5 µm. When the volume average particle size of the white pigment is within these preferred ranges, the reflection of light is sufficient to obtain a sufficiently dense white colour. The volume average particle size may be measured by a laser diffraction/scattering type particle size distribution analyzer.

The white primer may be provided onto the packaging by co-extrusion or any conventional coating technique, such as dip coating, knife coating, extrusion coating, spin coating, spray coating, slide hopper coating and curtain coating.

Alternatively, the laser markable composition and the primer may be provided onto the substrate by a printing method such as intaglio printing, screen printing, flexographic printing, offset printing, inkjet printing, gravure offset printing, tampon printing, etc.

The white primer may be water based or UV curable.

When the white primer is applied by inkjet printing, preferably UV curable inkjet printing, the white pigment particles in the white inkjet ink should be sufficiently small to permit free flow of the ink through the inkjet-printing device, especially at the ejecting nozzles. It is also desirable to use small particles to slow down sedimentation. The numeric average particle diameter of the titanium oxide is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm.

Preferred white pigments have a high refractive index, preferably a refractive index greater than 1.60, preferably greater than 2.00, more preferably greater than 2.50 and most preferably greater than 2.60. Such white pigments generally have a very covering power, i.e. a limited amount of white primer is necessary to hide the colour and defects of the substrate on which it is printed. Unfortunately, such white pigments also generally exhibit a high sedimentation degree and speed.

Suitable white pigments having high refractive index are given in the following table. The white pigments may be employed singly or in combination. The most preferred white pigment is titanium dioxide.

| C.I. Number | Chemical name | CAS RN |
| --- | --- | --- |
| Pigment white 1 | Lead hydroxide carbonate | 1319-46-6 |
| Pigment white 3 | Lead sulphate | 7446-14-2 |
| Pigment white 4 | Zinc oxide | 1314-13-2 |
| Pigment white 5 | Lithopone | 1345-05-7 |
| Pigment white 6 | Titanium dioxide | 13463-67-7 |
| Pigment white 7 | Zinc sulphide | 1314-98-3 |
| Pigment white 10 | Barium carbonate | 513-77-9 |
| Pigment white 11 | Antimony trioxide | 1309-64-4 |
| Pigment white 12 | Zirconium oxide | 1314-23-4 |
| Pigment white 14 | Bismuth oxychloride | 7787-59-9 |
| Pigment white 17 | Bismuth subnitrate | 1304-85-4 |
| Pigment white 18 | Calcium carbonate | 471-34-1 |
| Pigment white 19 | Kaolin | 1332-58-7 |
| Pigment white 21 | Barium sulphate | 7727-43-7 |
| Pigment white 24 | Aluminum hydroxide | 21645-51-2 |
| Pigment white 25 | Calcium sulphate | 7778-18-9 |
| Pigment white 27 | Silicon dioxide | 7631-86-9 |
| Pigment white 28 | Calcium metasilicate | 10101-39-0 |
| Pigment white 32 | Zinc phosphate cement | 7779-90-0 |

When used for food packaging or pharmaceutical applications, the white primer is preferably a "low migration" white primer.

Such a low migration white primer is preferably prepared by using a low migration white UV curable ink. The white pigment may be incorporated into the low migration UV curable inks described above.

An example of such a low migration UV curable white ink is disclosed in WO2014/032936, for example the white ink used in example 4.

Track and Trace

The 2D barcode may be used for so-called "track and trace" purposes.

Traceability is a major concern, and often a requirement for the medical and pharmaceutical community. In the event of a product recall, public safety and health are at risk. Manufacturers need the ability to quickly and positively identify and isolate all suspect products in the supply chain. Traceability is important for a packaging selected from the group consisting of food packaging, drink packaging, cosmetical packaging and medical packaging.

The basics of serialization (lot codes, batch codes, item numbers, time and date stamp) enable traceability from origination at the point of manufacture to the end of the supply chain. These data can stored as primary information in the 2D barcode. Serialization is important for consumer packaged goods, such as electronic components, toys, computers and other electronic consumer goods.

The 2D barcode according to the invention can also be used to check the authenticity of the product bought by a customer. Currently, this is a great concern for pharmaceuticals, since many fake or inferior products circulate via the internet.

It is important that the authenticity of the 2D barcode according to the present invention, and thus the product on which the barcode is applied, may be checked at the same time when reading the primary information with a conventional 2D-barcode-reader, for example stored on a mobile phone.

Laser Markable Composition

Any laser markable composition may be used to form the laser markable layer on the packaging substrate.

According to one embodiment, the laser markable layer is capable of forming a black colour upon exposure to infrared radiation by carbonization of ingredients, typically the binder, of the laser markable layer Such a laser markable layer, disclosed in for example EP-A 2335967, preferably comprises polymers selected from polycarbonate (PC), polybutylene terephthalate (PBT), polyvinyl chloride (PVC), polystyrene (PS) and copolymers thereof, such as e.g. aromatic polyester-carbonate and acrylonitrile butadiene styrene (ABS). An optothermal converting agent, which absorbs infrared radiation and converts that radiation it into heat, may be added to the laser markable layer to increase the marking density upon exposure to such infrared radiation.

Other laser markable compositions that may be used are those disclosed in for example WO2002/074548, comprising a binder and an oxyanion of a multivalent metal, such as ammonium octamolybdate (AOM), WO2006/018640 and WO2012/114121, both comprising a diacetylene compound, WO2007/141522 comprising a marking component, for example AOM, and a metal salt, for example reduced indium oxide, that absorbs laser irradiation at 780 to 2500 nm.

Preferred laser markable compositions include a leuco dye. Such laser markable compositions are disclosed in for example EP-A 2648920. A leuco dye is a substantially colourless compound, which may react upon exposure to infrared with for example a colour developing agent forming a coloured dye. Depending on the type of leuco dyes, or mixture of leuco dyes, any colour may be obtained.

The colour laser markable layers may comprise an optothermal converting agent such as an infrared absorbing dye (IR dye) or an infrared absorbing pigment (IR pigment), both absorbing the IR radiation and converting it into heat. An advantage of using IR dyes is that the absorption spectrum of an IR dye tends to be narrower than that of an IR pigment. This allows the production of multicoloured 2 D-barcodes when using a packaging comprising a plurality of laser markable layers, each laser markable layer containing different IR dyes and colour forming compounds. The IR dyes having a different maximum absorption wavelength can then be addressed by IR lasers with corresponding emission wavelengths causing colour formation only in the laser markable layer of the addressed IR dye. Such multicolour articles have been disclosed in for example U.S. Pat. No. 4,720,449, EP-A 2719540 and EP-A 2719541.

Preferred laser markable composition comprises a leucodye, an optothermal converting agent and a colour developing agent or colour developing agent precursor. The composition may further comprise an acid scavenger and a UV absorber.

Aqueous laser markable compositions, compared to solvent based compositions, are preferred for health and safety reasons.

Aqueous laser markable compositions are disclosed in for example for example WO2006/052842, WO2008/030428 and WO2014/124052.

Particular preferred aqueous laser markable compositions are disclosed in the unpublished applications PCT/EP2016/061069 (filed 18 May 2016) and PCT/EP2016/060533 (filed on Nov. 5, 2016).

A laser markable composition, which is preferably applied by an offset printing process is disclosed in the unpublished EP-A 16160674.4 (filed on 16 Mar. 2016).

When the laser markable composition is used for the manufacture of food packaging or pharmaceutical applications, the laser markable composition is preferably a so-called "low migration" laser markable composition. The term "low migration" packaging is commonly used to designate materials used in the packaging structure whose chemicals will not migrate, or move, from the packaging into the product. To qualify as low migration packaging, the materials contained in the packaging structure, including printing inks, coatings and adhesives, must not have any migratory chemicals which would affect the appearance, flavour, odour, taste, or the safety of the product contained within the packaging. Preferred low migration laser markable compositions, comprising for example diffusion hindered leuco dyes, optothermal converting agents, colour developing agents or colour developing agent precursors are disclosed in the unpublished EP-A 15196923.5 (filed on 30 Nov. 2015).

Leuco Dye

A leuco dye is a substantially colourless compound, which may form a coloured dye upon inter- or intra-molecular reaction. The inter- or intra-molecular reaction is triggered by heat formed during exposure with an IR laser.

Examples of leuco dyes are disclosed in WO2015/165854, paragraph [069] to [093].

As offset inks and varnishes are typical apolar solutions, preferred leuco dyes to be used in such inks or varnishes are soluble or dispersable in apolar media.

In a preferred embodiment, at least one of the auxochromic groups of the leuco dye is functionalized with an optionally substituted branched aliphatic group. An auxochromic group is a group of atoms attached to a chromophore, which modified the ability of that chromophore to absorb light (absorption wavelength and/or absorption density).

In a particularly preferred embodiment the optionally substituted branched aliphatic group has at least five carbon atoms, more preferably at least eight carbon atoms and most preferably at least ten carbon atoms.

Particularly preferred Leuco dyes comprising a structural element according to general Formulae I or II,

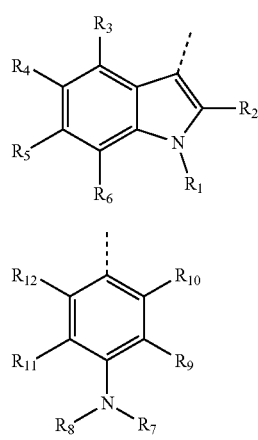

Formula I

Formula II wherein $R_1$ represents an optionally substituted branched alkyl group, $R_2$ represents a group selected from the group consisting of an alkyl group and an aryl group, $R_3$ to $R_6$ are independently selected from the group consisting of hydrogen, an optionally substituted alkyl group, an optionally substituted alkenyl group, an optionally substituted alkynyl group, an optionally substituted alkaryl group, an optionally substituted aralkyl group, an optionally substituted aryl or heteroaryl group, a halogen, an amine, an amide, an ester, an optionally substituted alkoxy group, an optionally substituted aryloxy group, an optionally substituted thioalkoxy group and an optionally substituted thioaryloxy group, $R_7$ and $R_8$ represent an optionally substituted alkyl group, an optionally substituted alkenyl group, an optionally substituted alkynyl group, an optionally substituted aralkyl group, an optionally substituted alkaryl group and an optionally substituted aryl or heteroaryl group, with the proviso that at least one of $R_7$ and $R_8$ represents an optionally substituted branched alkyl group, $R_9$ to $R_{12}$ are independently selected from the group consisting of hydrogen, an optionally substituted alkyl group, an optionally substituted alkenyl group, an optionally substituted alkynyl group, an optionally substituted alkaryl group, an optionally substituted aralkyl group, an optionally substituted aryl or heteroaryl group, a halogen, an amine, an amide, an ester, an optionally substituted alkoxy group, an optionally substituted aryloxy group, an optionally substituted thioalkoxy group and an optionally substituted thioaryloxy group, and wherein the dashed line represents the coupling position to the rest of the chromophore.

In a particularly preferred embodiment $R_1$ has at least five carbon atoms, more preferably at least eight carbon atoms and most preferably at least ten carbon atoms.

In a particularly preferred embodiment $R_1$ is coupled to the nitrogen of the indole ring via a secondary carbon atom.

In a further preferred embodiment $R_7$ and $R_8$ represent an optionally substituted alkyl group with the proviso that at least one of $R_7$ and $R_8$ represents an optionally substituted branched alkyl group, preferably comprising at least five carbon atoms, more preferably at least eight carbon atoms and most preferably at least ten carbon atoms.

In a particularly preferred embodiment at least one of $R_7$ and $R_8$ is bonded to the nitrogen atom of the aniline functional group via a secondary carbon atom.

Particularly preferred leuco dyes functionalized with optionally substituted branched alkyl groups on the auxochromic group are selected from leuco dyes according to Formulae III to VIII.

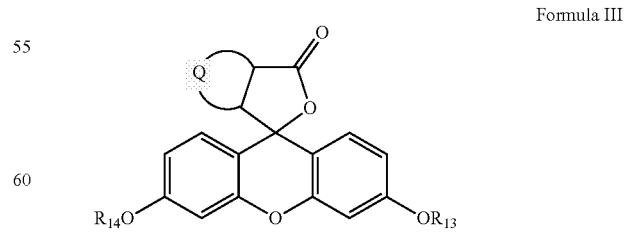

Formula III wherein $R_{13}$ and $R_{14}$ are independently selected from the group consisting of an optionally substituted alkyl group or branched alkyl group with the proviso that at least one of $R_{13}$ and $R_{14}$ represents an optionally substituted branched alkyl group and Q represents the necessary atoms to form a six membered optionally substituted aromatic or heteroaromatic ring;

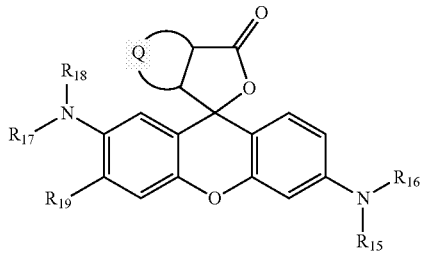

Formula IV wherein $R_{15}$, $R_{16}$, $R_{17}$ and $R_{18}$ are independently selected from the group consisting of an optionally substituted alkyl group or branched alkyl group with the proviso that at least one of $R_{15}$, $R_{16}$, $R_{17}$ and $R_{18}$ represents an optionally substituted branched alkyl group, $R_{19}$ is selected from the group consisting of a hydrogen and an optionally substituted alkyl group and Q represents the necessary atoms to form a six membered optionally substituted aromatic or heteroaromatic ring;

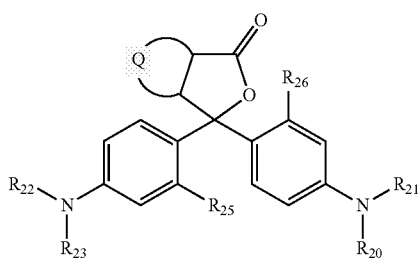

Formula V wherein $R_{20}$, $R_{21}$, $R_{22}$ and $R_{23}$ are independently selected from the group consisting of an optionally substituted alkyl group or branched alkyl group with the proviso that at least one of $R_{20}$, $R_{21}$, $R_{22}$ and $R_{23}$ represents an optionally substituted branched alkyl group, $R_{25}$ and $R_{26}$ are selected from the group consisting of a hydrogen, an optionally substituted alkyl group and an optionally substituted alkoxy group and Q represents the necessary atoms to form a six membered optionally substituted aromatic or heteroaromatic ring;

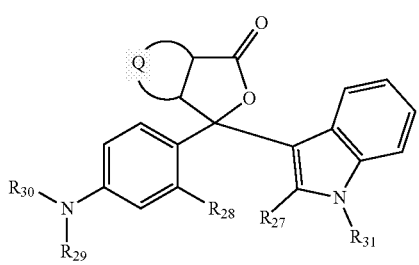

Formula VI wherein $R_{29}$, $R_{30}$ and $R_{31}$ are independently selected from the group consisting of an optionally substituted alkyl group or branched alkyl group with the proviso that at least one of $R_{29}$, $R_{30}$ and $R_{31}$ represents an optionally substituted branched alkyl group, $R_{27}$ represents an optionally substituted alkyl group or an optionally substituted aryl group, $R_{28}$ is selected from the group consisting of a hydrogen, an optionally substituted alkyl group and an optionally substituted alkoxy group and Q represents the necessary atoms to form a six membered optionally substituted aromatic or heteroaromatic ring;

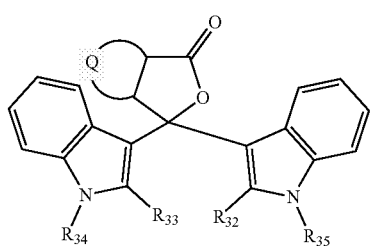

Formula VII wherein $R_{34}$ and $R_{35}$ are independently selected from the group consisting of an optionally substituted alkyl group or branched alkyl group with the proviso that at least one of $R_{34}$ and $R_{35}$ represents an optionally substituted branched alkyl group, $R_{32}$ and $R_{33}$ are an optionally substituted alkyl group or an optionally substituted aryl group and Q represents the necessary atoms to form a six membered optionally substituted aromatic or heteroaromatic ring;

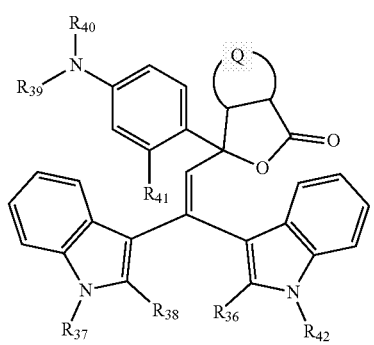

Formula VIII wherein $R_{37}$, $R_{39}$, $R_{40}$ and $R_{42}$ are independently selected from the group consisting of an optionally substituted alkyl group or branched alkyl group with the proviso that at least one of $R_{37}$, $R_{39}$, $R_{40}$ and $R_{42}$ represents an optionally substituted branched alkyl group, $R_{36}$ and $R_{38}$ are independently selected from the group consisting of an optionally substituted alkyl group or an optionally substituted aryl group, $R_{41}$ is independently selected from the group consisting of a hydrogen, an optionally substituted alkyl group and an optionally substituted alkoxy group, and Q represents the necessary atoms to form a six membered optionally substituted aromatic or heteroaromatic ring.

Typical examples of preferred leuco dyes are given below without being limited thereto.

TABLE 1
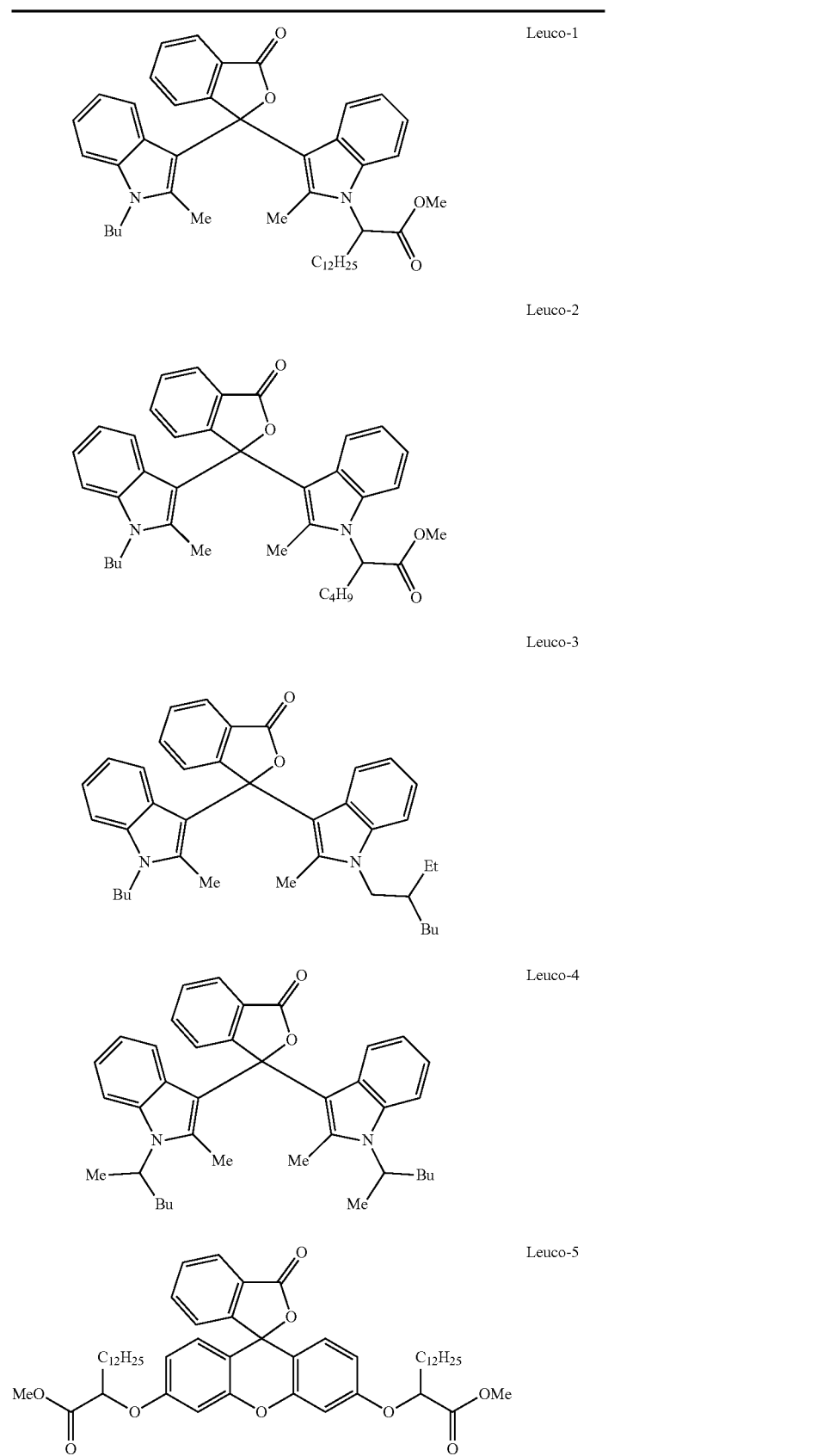

TABLE 1-continued
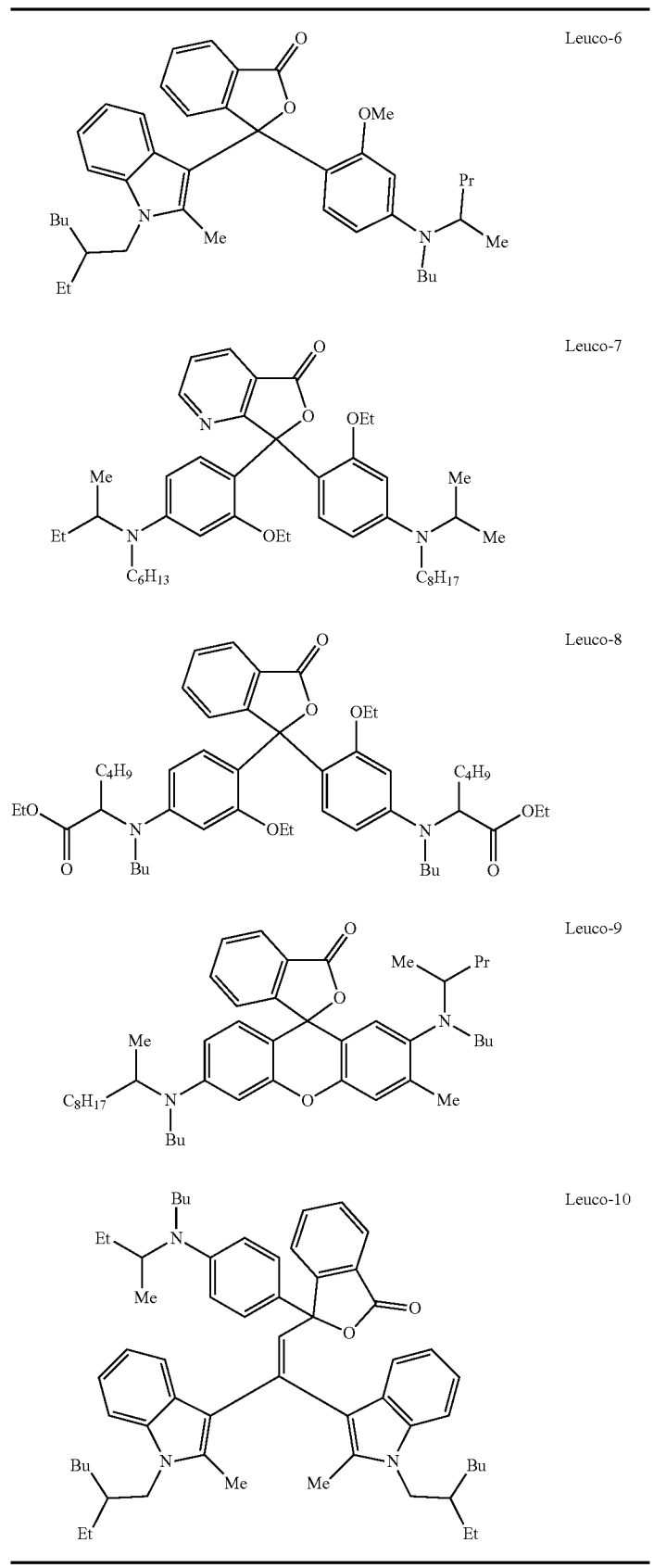

Leuco dyes may become "diffusion hindered" by:
including the leuco dye in the core of a capsule composed of a polymeric shell surrounding a core;
polymerizing or co-polymerizing the leuco dye to form a polymeric leuco dye; or
linking two or more basic leuco dyes to each other whereby the total molecular weight of the resulting compound becomes at least twice the molecular weight of the basic ingredient with the proviso that the total molecular weight is at least 500, more preferably at least 750 and most preferably at least 1000.

By using a diffusion hindered leuco dye, the risk of penetrating through a food or pharmaceutical packaging is minimized. Furthermore, the leuco dye cannot be extracted by moisture, e.g. by sweaty hands, before heat treatment or verification of the authenticity of the packaging.

Capsules

The leuco dye may be become "diffusion hindered" by including the leuco dye in the core of a capsule composed of a polymeric shell surrounding a core.

The capsules have preferably an average particle size of not more than 5 μm, more preferably of not more than 2 μm, most preferably of not more than 1 μm as determined by dynamic laser diffraction. Capsules having an average particle size smaller than 1 μm are typically called nanocapsules while capsules having an average particle size above 1 μm are typically called microcapsules.

The morphology of capsules and their preparation methods have been reviewed, for example, by Jyothi Sri.S in the International Journal of Pharma and Bio Sciences (Vol. 3, Issue 1, January-March 2012).

The capsules may have different morphologies, dependent on the preparation method of the capsules. For example mononuclear capsules have a shell around a core while polynuclear capsules have multiple cores enclosed within the shell. Matrix encapsulation refers to a core material which is homogeneously distributed into the shell.

Hydrophilic polymers, surfactants and/or polymeric dispersants may be used to obtain stable dispersions of the capsules in an aqueous medium and to control the particle size and the particle size distribution of the capsules.

In a preferred embodiment, the capsules are dispersed in the aqueous medium using a dispersing group covalently bonded to the polymeric shell. The dispersing group is preferably selected from a group consisting of a carboxylic acid or salt thereof, a sulfonic acid or salt thereof, a phosphoric acid ester or salt thereof, a phosphonic acid or salt thereof, an ammonium group, a sulfonium group, a phosphonium group and a polyethylene oxide group.

The dispersing groups stabilize the aqueous dispersion by electrostatic stabilization. For example, a slightly alkaline aqueous medium will turn the carboxylic acid groups covalently bonded to the polymeric shell into ionic groups, whereafter the negatively charged capsules have no tendency to agglomerate. If sufficient dispersing groups are covalently bonded to the polymeric shell, the capsule becomes a so-called self-dispersing capsule. Other dispersing groups such as sulfonic acid groups tend to be dissociated even in acid aqueous medium and thus do not require the addition of an alkali.

The dispersing group can be used in combination with a polymeric dispersant in order to accomplish steric stabilization. For example, the polymeric shell may have covalently bonded carboxylic acid groups that interact with amine groups of a polymeric dispersant. However, in a more preferred embodiment, no polymeric dispersant is used and dispersion stability is accomplished solely by electrostatic stabilization.

The capsules may also be stabilized by solid particles which adsorb onto the shell. Preferred solid particles are colloidal silica.

There is no real limitation on the type of polymer used for the polymeric shell of the capsule. Preferably, the polymer used in the polymeric shell is crosslinked. By crosslinking, more rigidity is built into the capsules allowing a broader range of temperatures and pressures for handling the colour laser markable article.

Preferred examples of the polymeric shell material include polyureas, polyacrylates, polymethacrylates, polyurethanes, polyesters, polycarbonates, polyamides, melamine based polymers and mixtures thereof, with polyureas and polyurethanes being especially preferred.

Capsules can be prepared using both chemical and physical methods. Suitable encapsulation methodologies include complex coacervation, liposome formation, spray drying and polymerization methods.

In the present invention, preferably a polymerization method is used as it allows the highest control in designing the capsules. More preferably interfacial polymerization is used to prepare the capsules used in the invention. This technique is well-known and has recently been reviewed by Zhang Y. and Rochefort D. (Journal of Microencapsulation, 29(7), 636-649 (2012) and by Salitin (in Encapsulation Nanotechnologies, Vikas Mittal (ed.), chapter 5, 137-173 (Scrivener Publishing LLC (2013)).

Interfacial polymerization is a particularly preferred technology for the preparation of capsules according to the present invention. In interfacial polymerization, such as interfacial polycondensation, two reactants meet at the interface of the emulsion droplets and react rapidly.

In general, interfacial polymerization requires the dispersion of an oleophilic phase in an aqueous continuous phase or vice versa. Each of the phases contains at least one dissolved monomer (a first shell component) that is capable of reacting with another monomer (a second shell component) dissolved in the other phase. Upon polymerisation, a polymer is formed that is insoluble in both the aqueous and the oleophilic phase. As a result, the formed polymer has a tendency to precipitate at the interface of the oleophilic and aqueous phase, hereby forming a shell around the dispersed phase, which grows upon further polymerization. The capsules according to the present invention are preferably prepared from an oleophilic dispersion in an aqueous continuous phase.

Typical polymeric shells, formed by interfacial polymerization are selected from the group consisting of polyamides, typically prepared from di- or oligoamines as first shell component and di- or poly-acid chlorides as second shell component; polyurea, typically prepared from di- or oligoamines as first shell component and di- or oligoisocyanates as second shell component; polyurethanes, typically prepared from di- or oligoalcohols as first shell component and di- or oligoisocyanates as second shell component; polysulfonamides, typically prepared from di- or oligoamines as first shell component and di- or oligosulfochlorides as second shell component; polyesters, typically prepared from di- or oligoalcohols as first shell component and di- or oligo-acid chlorides as second shell component; and polycarbonates, typically prepared from di- or oligoalcohols as first shell component and di- or oligo-chloroformates as second shell component. The shell can be composed of combinations of these polymers.

In a further embodiment, polymers, such as gelatine, chitosan, albumin and polyethylene imine can be used as first shell components in combination with a di- or oligo-isocyanate, a di- or oligo acid chloride, a di- or oligo-chloroformate and an epoxy resin as second shell component.

In a particularly preferred embodiment, the shell is composed of a polyurethane, a polyurea or a combination thereof.

In a further preferred embodiment, a water immiscible solvent is used in the dispersion step, which is removed by solvent stripping before or after the shell formation. In a particularly preferred embodiment, the water immiscible solvent has a boiling point below 100° C. at normal pressure. Esters are particularly preferred as water immiscible solvent. A preferred organic solvent is ethyl acetate, because it also has a low flammability hazard compared to other organic solvents.

A water immiscible solvent is an organic solvent having low miscibility in water. Low miscibility is defined as any water solvent combination forming a two phase system at 20° C. when mixed in a one over one volume ratio.

The method for preparing a dispersion of capsules preferably includes the following steps:
a) preparing a non-aqueous solution of a first shell component for forming a polymeric shell, a leuco dye, and optionally a water immiscible organic solvent having a lower boiling point than water;
b) preparing an aqueous solution of a second shell component for forming the polymeric shell;
c) dispersing the non-aqueous solution under high shear in the aqueous solution;
d) optionally stripping the water immiscible organic solvent from the mixture of the aqueous solution and the non-aqueous solution; and
e) preparing the polymeric shell around the leuco dye by interfacial polymerization of the first and second shell components for forming the polymeric shell.

An optothermal converting agent may be added together with the leuco dye in step (a) to the non-aqueous solution resulting in capsules wherein both the leuco dye and the optothermal converting agent are located in the core of the capsule.

A colour developing agent or colour developing agent precursor is preferably separately encapsulated. In a preferred embodiment, the laser markable composition comprises a first capsule containing a leuco dye and an optional optothermal converting agent in its core and a second capsule containing a colour developing agent or colour developing agent precursor in its core.

The capsules may contain two, three or more different leuco dyes in order to optimize the colour obtained upon heat treatment.

Polymeric Leuco Dyes

A leuco dye may also become diffusion hindered by polymerizing or co-polymerizing the leuco dye to form a polymeric leuco dye or by post derivation of a polymeric resin with the leuco dye.

Typical polymeric leuco dyes obtained by copolymerizing a polymerisable leuco dye with other monomers, represented by the comonomers, are given in Table 2 without being limited thereto.

TABLE 2

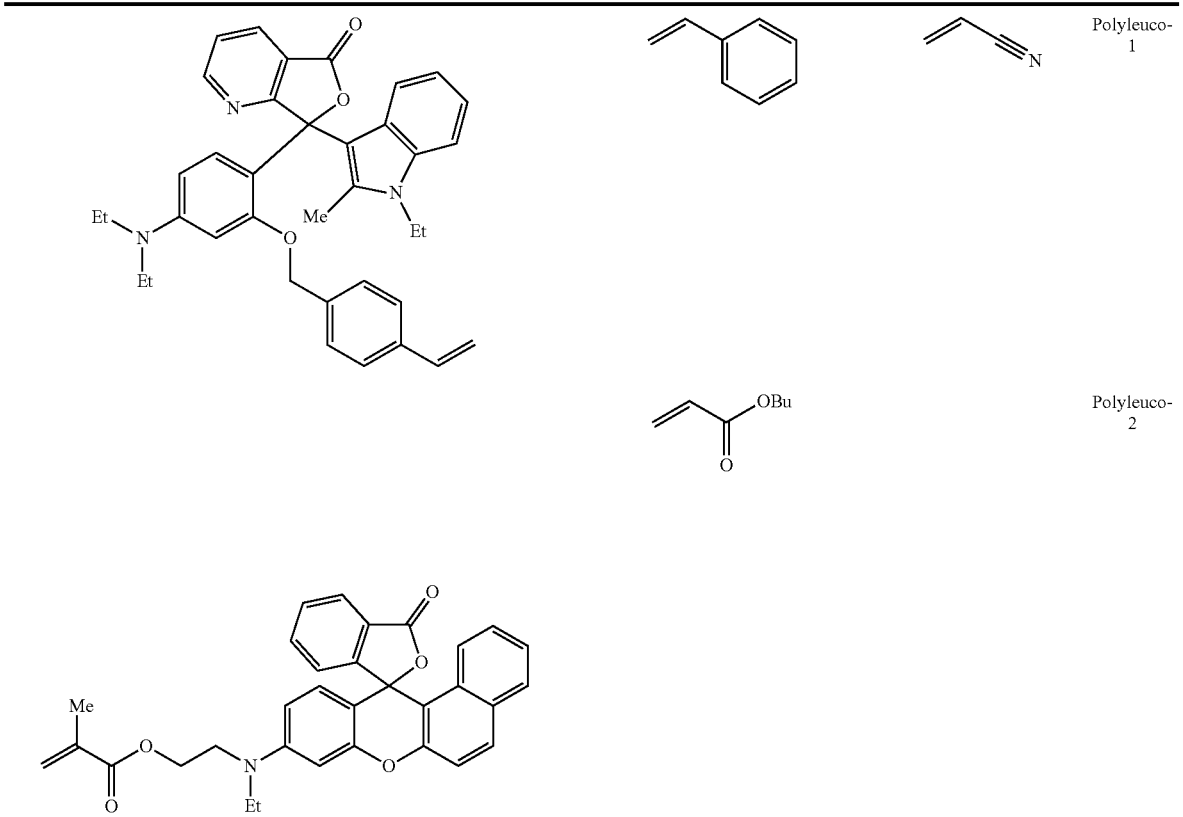

TABLE 2-continued

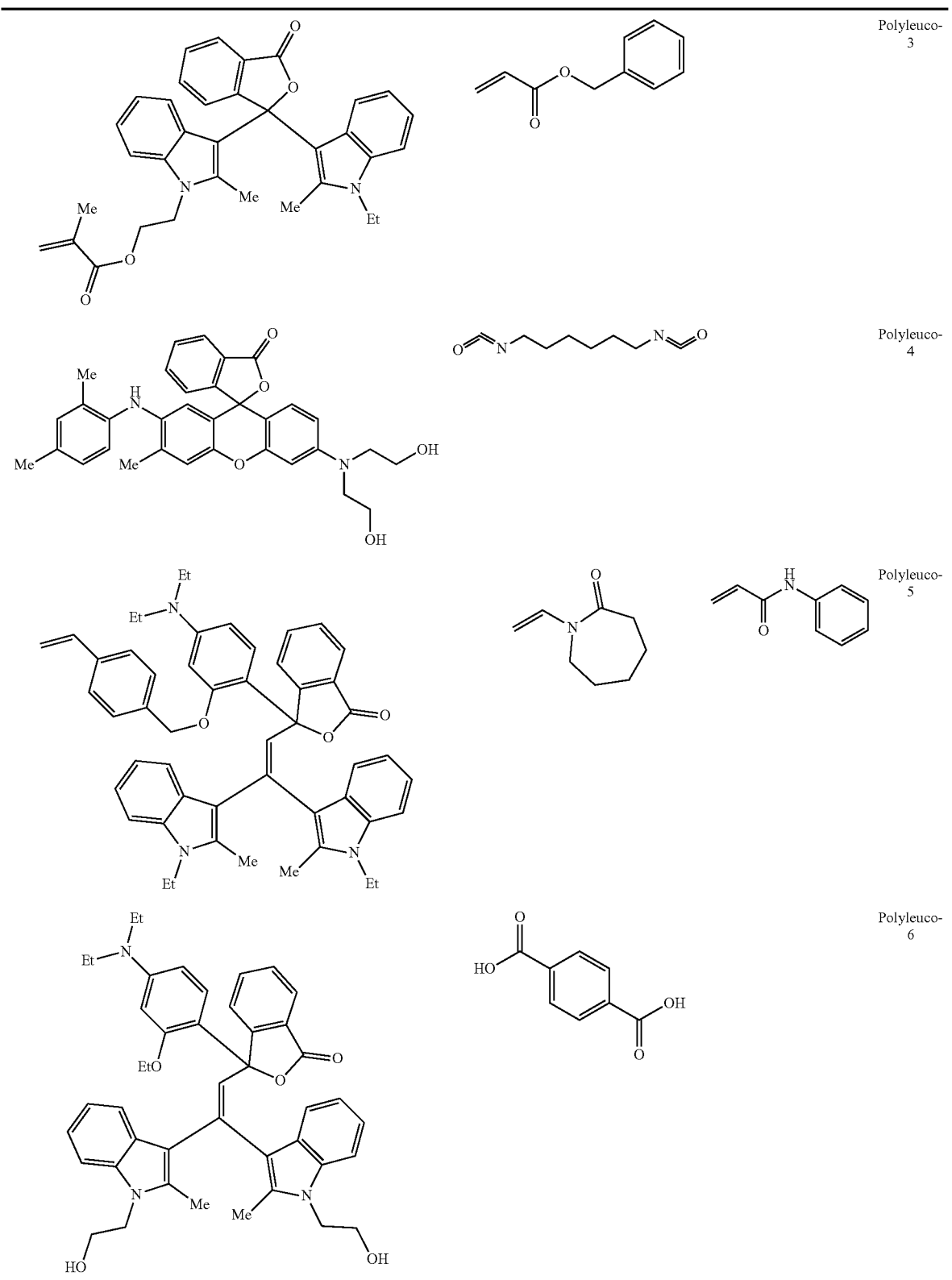

When the laser markable composition is an aqueous composition, the polymeric leuco dye is preferably added to the composition as polymeric particles dispersed in water, also referred to as a latex.

The polymer particles have an average particle diameter measured by dynamic laser diffraction of from 10 nm to 800 nm, preferably from 15 to 350 nm, more preferably from 20 to 150 nm, most preferably from 25 nm to 100 nm.

In a preferred embodiment of the invention, the polymer particle is a copolymer comprising a monomeric unit containing a leuco dye. The monomer containing the leuco dye is preferably used in combination with other monomers selected from the group consisting of ethylene, vinylchloride, methylacrylate, methylmethacrylate ethylacrylate, ethylmethacrylate, vinylidene chloride, acrylonitrile, methacrylonitrile, vinylcarbazole, or styrene.

The amount of monomers containing a leuco dye relative to the total weight of the polymer particles is preferably between 2 and 30 wt %, more preferably between 5 and 15 wt %. The amount of monomers containing a leuco dye is typically optimized in order to obtain sufficient colour formation upon exposure to heat or IR radiation.

The polymeric leuco dyes may be obtained through a radical (co)-polymerization or through a condensation reaction.

The polymer particles are preferably prepared by an emulsion polymerization. Emulsion polymerization is typically carried out through controlled addition of several components—i.e. vinyl monomers, surfactants (dispersion aids), initiators and optionally other components such as buffers or protective colloids—to a continuous medium, usually water. The resulting polymer of the emulsion polymerization is a dispersion of discrete particles in water. The surfactants or dispersion aids which are present in the reaction medium have a multiple role in the emulsion polymerization: (1) they reduce the interfacial tension between the monomers and the aqueous phase, (2) they provide reaction sites through micelle formation in which the polymerization occurs and (3) they stabilize the growing polymer particles and ultimately the latex emulsion. The surfactants are adsorbed at the water/polymer interface and thereby prevent coagulation of the fine polymer particles. A wide variety of surfactants are used for the emulsion polymerisation. In general, a surfactant molecule contains both polar (hydrophilic) and non-polar (hydrophobic or lipophilic) groups. The most used surfactants are anionic or non-ionic surfactants. Widely used anionic surfactants are, alkylsulfates, alkyl ether sulfates, alkyl ether carboxylates, alkyl or aryl sulfonates, alkyl phosphates or alkyl ether phosphates. An example of an alkyl sulfate surfactant is sodium lauryl sulfate (e.g. Texapon K12 by the company Cognis). An example of an alkyl ether sulfate surfactant is laureth-2 sulfate sodium salt (e.g. Empicol ESB form the company Huntsman). An example of an alkyl ether carboxylate is laureth-6 carboxylate (e.g. Akypo RLM45 from the company Kao Chemicals). An example of an alkyl ether phosphate is Trideceth-3 phosphate ester (e.g. Chemfac PB-133 from the company Chemax Inc.).

The critical micelle concentration (C.M.C.) of the used surfactants is an important property to control the particle nucleation and consequently the particle size and stabilization of the polymer particles. The C.M.C. can be varied by variation of the degree of ethoxylation of the surfactant. Alkyl ether sulfates having a different degree of ethoxylation are for example Empicol ESA (Laureth-1 sulfate sodium salt), Empicol ESB (Laureth-2 sulfate sodium salt) and Empicol ESC (Laureth-3 sulfate sodium salt). Alkyl ether carboxylates having a different degree of ethoxylation are for example Akypo RLM-25 (Laureth-4 carboxylic acid), Akypo RLM-45 (Laureth-6 carboxylic acid) and Akypo RLM-70 (Laureth-8 carboxylic acid). Alkyl ether phosphates having a different degree of ethoxylation are for example Chemfac PB-133 (Trideceth-3 phosphate ester, acid form), Chemfac PB-136 (Trideceth-6-phosphate ester, acid form) and Chemfac PB-139 (Trideceth-9-phosphate ester, acid form).

The carboxylate and phosphate ester surfactants are usually supplied in the acid form. In order to prepare an aqueous solution of these surfactants, a base such as NaOH, $Na_2CO_3$, $NaHCO_3$, $NH_4OH$, or $NH_4HCO_3$ must be added.

In a preferred embodiment, the polymer particles are prepared by emulsion polymerization in the presence of a surfactant selected from alkyl phosphates and alkyl ether phosphates.

Another preferred method of preparing the polymer particles is the so-called mini-emulsion polymerization method as described for example by TANG et al. in Journal of Applied Polymer Science, Volume 43, pages 1059-1066 (1991) and by Blythe et al. in Macromolecules, 1999, 32, 6944-6951.

Instead of using surfactants to stabilize the polymer particles, self-dispersible polymer particles may also be used. In preparing self-dispersing polymer particles, preferably a monomer is used selected from the group consisting of a carboxylic acid monomer, a sulfonic acid monomer, and a phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxy methylsuccinic acid. Specific examples of the unsaturated sulfonic acid monomer include styrene sulfonic acid, 2-acrylamido-2-methyl propane sulfonic acid, 3-sulfopropyl (meth)acrylate, and bis-(3-sulfopropyl)-itaconate. Specific examples of the unsaturated phosphoric acid monomer include vinyl phosphoric acid, vinyl phosphate, and bis(methacryloxyethyl)phosphate. Such monomers may be incorporated into polyurethane copolymers which include a (meth)acrylate polymeric chain.

Besides traditional emulsion polymerization wherein nucleation, i.e. initiation of the polymerization, is done via micellar or homogeneous nucleation, the so-called mini-emulsion polymerization, may also be used to prepare the polymer particles. In emulsion polymerization, the nucleation occurs in the monomer droplet. See for example "Emulsion Polymerization and Emulsion Polymers", edited by Peter A. Lovell and Mohamed S. E1-AASSER, 1997, page 42-43, wherein the different types of emulsion polymerization are described in more detail.

A mini-emulsion polymerization method is described in for example by TANG et al. in Journal of Applied Polymer Science, Volume 43, pages 1059-1066 (1991) and by Blythe et al. in Macromolecules, 1999, 32, 6944-6951.

Instead of using a monomer containing a leuco dye in a co-polymerization reaction to form the polymer particles.

Polymeric leuco dyes may also be obtained by post-derivatisation of a polymer resin. A leuco dye may also be covalently bonded to a already formed polymer particle, when reactive groups are present on the polymer particles which can react with a reactive leuco dye. To increase the efficiency of such a reaction, the reactive leuco dye may be added in a solvent which swells the polymer particles. That solvent may then be subsequently evaporated.

Examples of oligomeric and polymeric leuco dyes accessible using post derivatisation of polymeric resins as synthetic strategy are given in Table 3 without being limited thereto.

TABLE 3

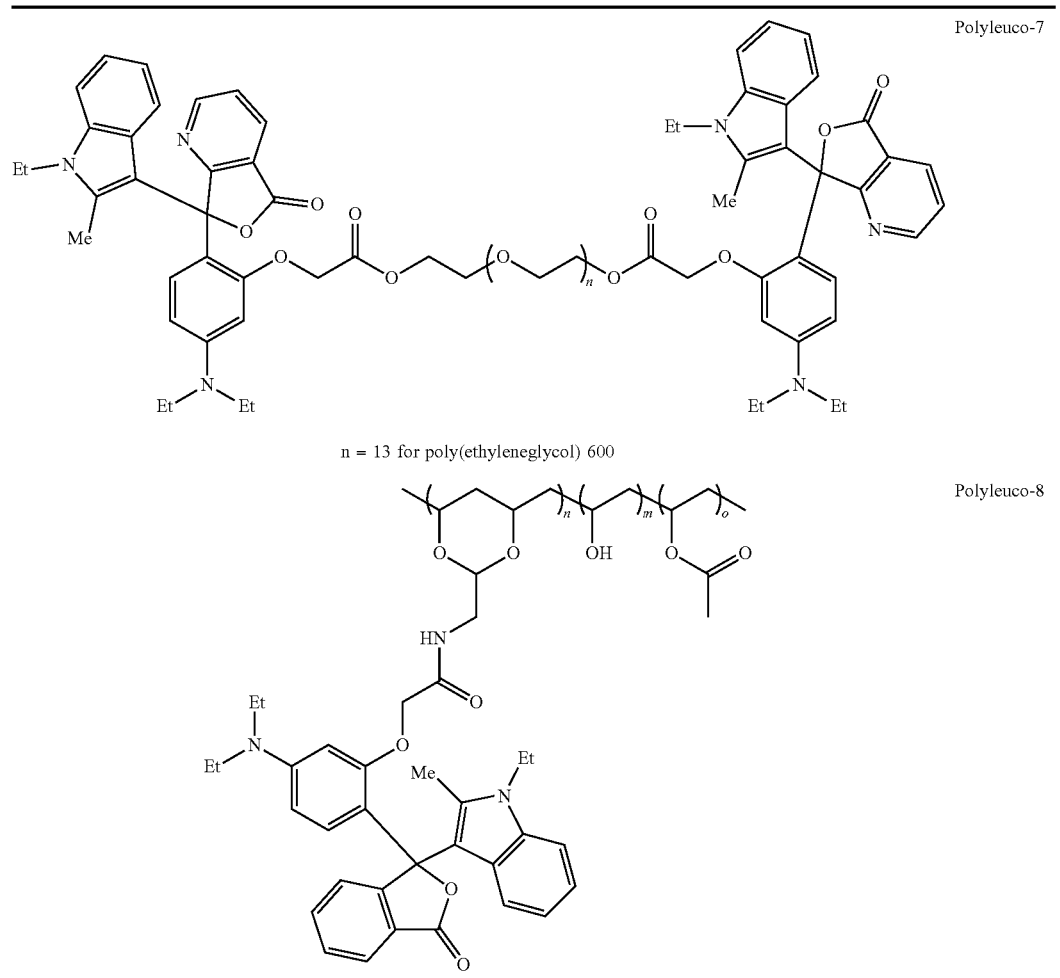

n = 13 for poly(ethyleneglycol) 600

Multifunctional Leuco Dyes

According to another embodiment, a leuco dye may become diffusion hindered by linking two or more basic leuco dyes to each other whereby the total molecular weight becomes at least twice the molecular weight of the basic leuco dye with the proviso that the total molecular weight is at least 500, more preferably at least 750 and most preferably at least 1000.

Typical di- and multifunctional leuco dyes are given in Table 4 without being limited thereto.

TABLE 4

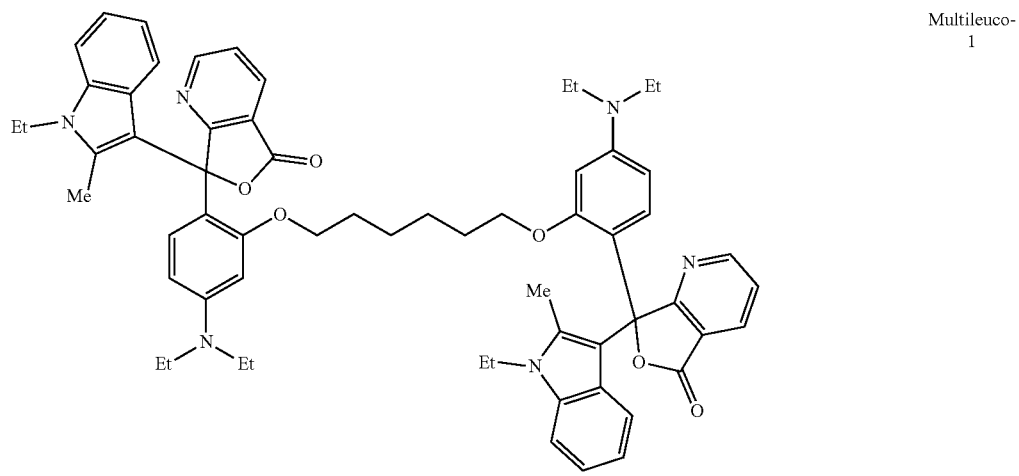

TABLE 4-continued

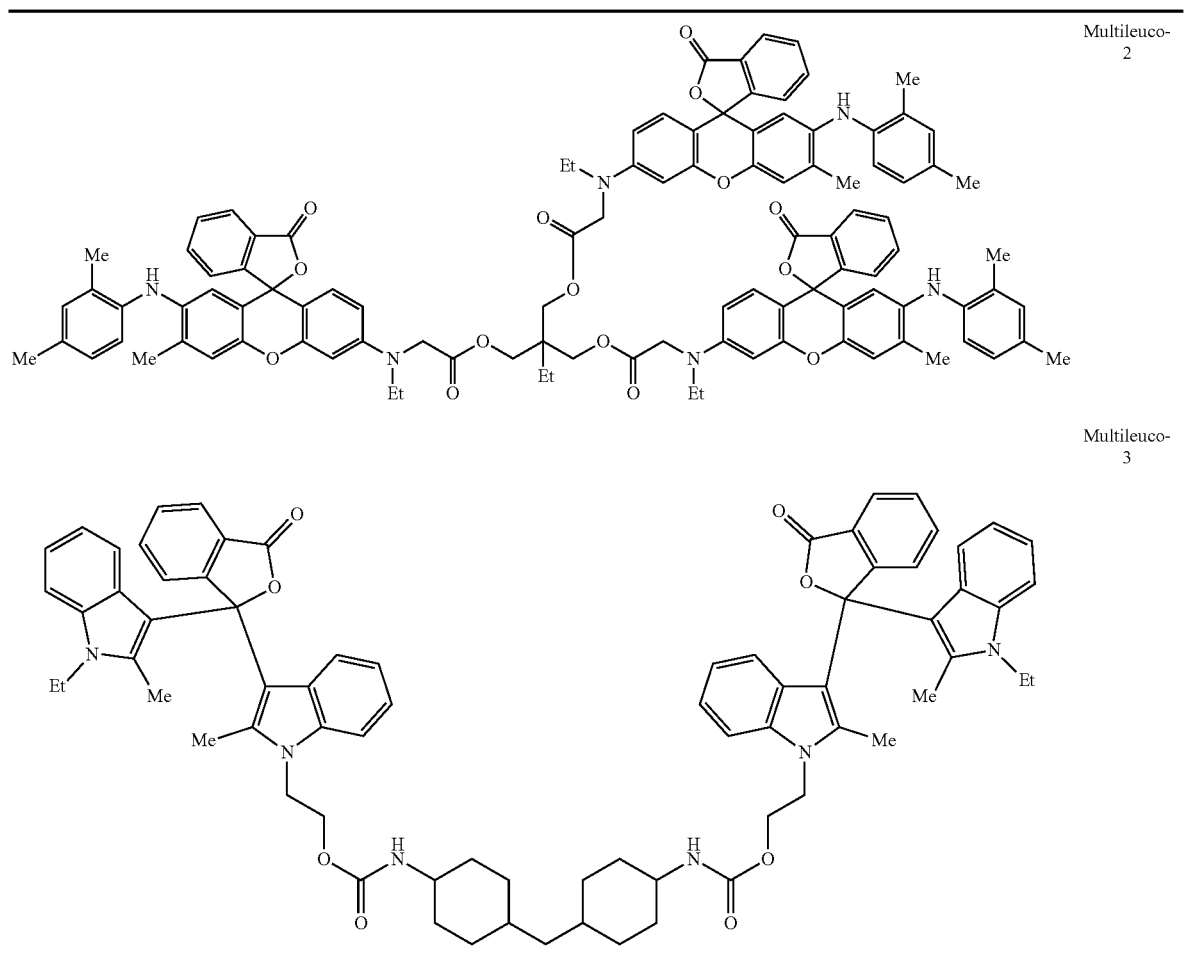

Multileuco-2

Multileuco-3

Polymerisable Leuco Dyes

In the embodiment wherein a UV curable composition, for example a UV curable inkjet ink, a polymerisable leuco dye is preferably used. Preferably, the leuco dye has two polymerisable groups.

Upon UV curing the composition, the leuco dyes are copolymerized together with the other monomers of the composition. As part of the resulting polymeric network, the leuco dyes also become diffusion hindered.

Typical polymerisable leuco dyes are given in Table 5 without being limited thereto.

TABLE 5

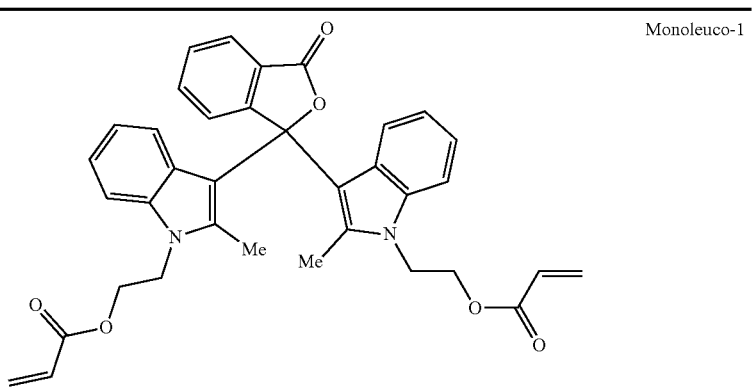

Monoleuco-1

TABLE 5-continued
Monoleuco-2
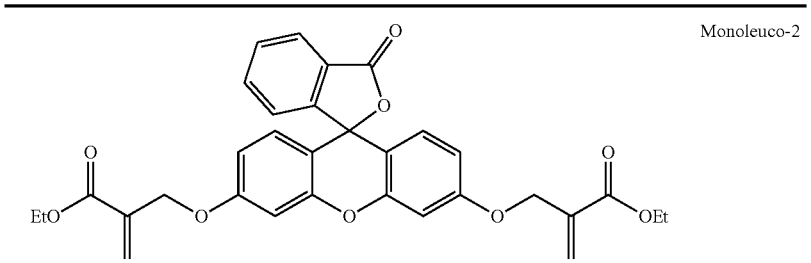
Monoleuco-3
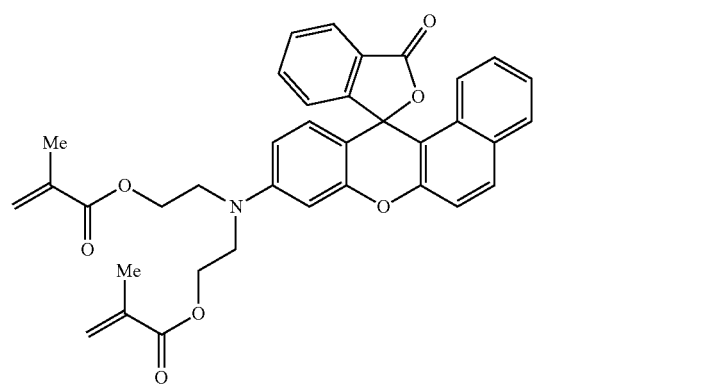 [SMILES: C=C(C)C(=O)OCCN(CCOC(=O)C(=C)C)c1ccc2c(c1)Oc1ccc3ccccc3c1C21OC(=O)c2ccccc21]
Monoleuco-4
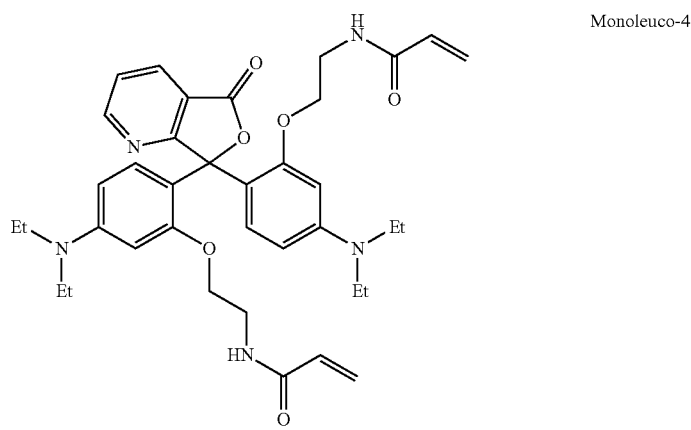
Monoleuco-5
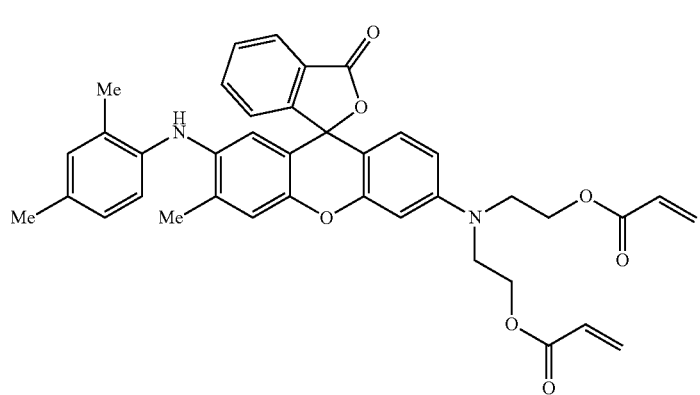 [SMILES: C=CC(=O)OCCN(CCOC(=O)C=C)c1ccc2c(c1)Oc1cc(C)c(Nc3ccc(C)cc3C)cc1C21OC(=O)c2ccccc21]

TABLE 5-continued
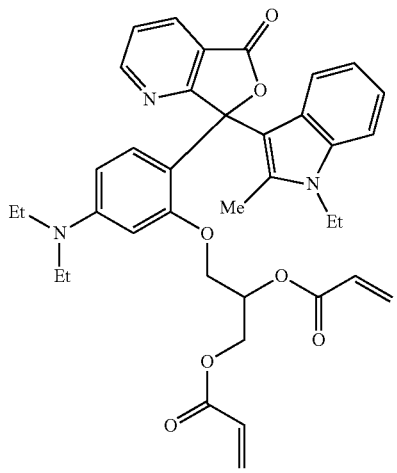 [SMILES: C=CC(=O)OCC(COc1cc(N(CC)CC)ccc1C1(c2c(C)n(CC)c3ccccc23)OC(=O)c2cccnc21)OC(=O)C=C]
Monoleuco-6
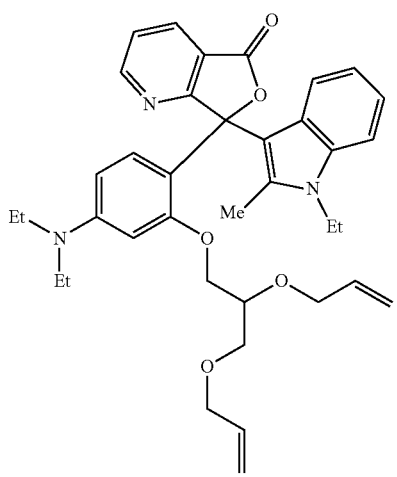 [SMILES: C=CCOCC(COc1cc(N(CC)CC)ccc1C1(c2c(C)n(CC)c3ccccc23)OC(=O)c2cccnc21)OCC=C]
Monoleuco-7
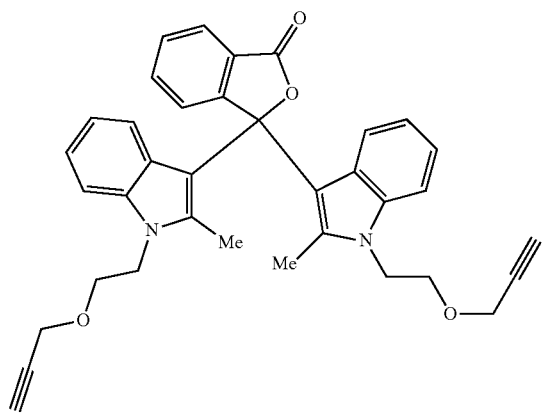 [SMILES: C#CCOCCn1c(C)c(C2(c3c(C)n(CCOCC#C)c4ccccc34)OC(=O)c3ccccc32)c2ccccc21]
Monoleuco-8

TABLE 5-continued

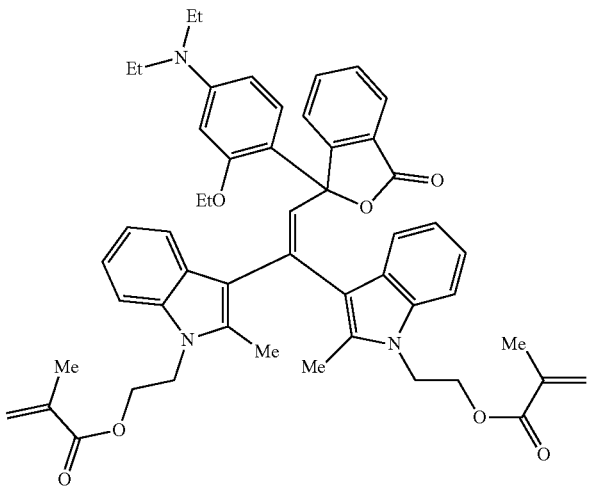 [SMILES: C=C(C)C(=O)OCCn1c(C)c(C(=CC2(c3ccc(N(CC)CC)cc3OCC)OC(=O)c3ccccc32)c2c(C)n(CCOC(=O)C(=C)C)c3ccccc23)c2ccccc21]

Monoleuco-9

Optothermal Converting Agent

An optothermal converting agent generates heat upon absorption of radiation. The optothermal converting agent preferably generates heat upon absorption of infrared radiation, more preferably near infrared radiation. Near infrared radiation has a wavelength between 800 and 2000 nm.

The optothermal converting agent is preferably a metal free optothermal converting agent in view of environmentally and toxicological considerations.

The metal free optothermal converting agent is preferably an infrared radiation absorbing dye (IR dye), an infrared radiation absorbing pigment (IR pigment), or a combination thereof.

Infrared absorbing dyes are preferred for their narrow absorption spectra, compared to pigments, enabling multicolour images to be formed.

Infrared Radiation Absorbing (IR) Dye

Preferred IR dyes are polymethine dyes due to their low absorption in the visible region and their selectivity, i.e. narrow absorption peak in the infrared region. Particular preferred polymethine IR dyes are cyanine IR dyes.

Preferred IR having an absorption maximum of more than 1100 nm are those disclosed in EP-A 2722367, paragraphs [0044] to [0083] and WO2015/165854, paragraphs [0040] to [0051].

IR dyes having an absorption maximum between 1000 nm and 1100 nm are preferably selected from the group consisting of quinoline dyes, indolenine dyes, especially a benzo[cd]indoline dye. A particularly preferred IR dye is 5-[2,5-bis[2-[1-(1-methylbutyl)-benz[cd]indol-2 (1H)-ylidene]ethylidene]-cyclopentylidene]-1-butyl-3-(2-methoxy-1-methylethyl)-2,4,6(1H,3H,5H)-pyrimidinetrione (CASRN 223717-84-8) represented by the Formula IR-1, or the IR dye represented by Formula IR-2:

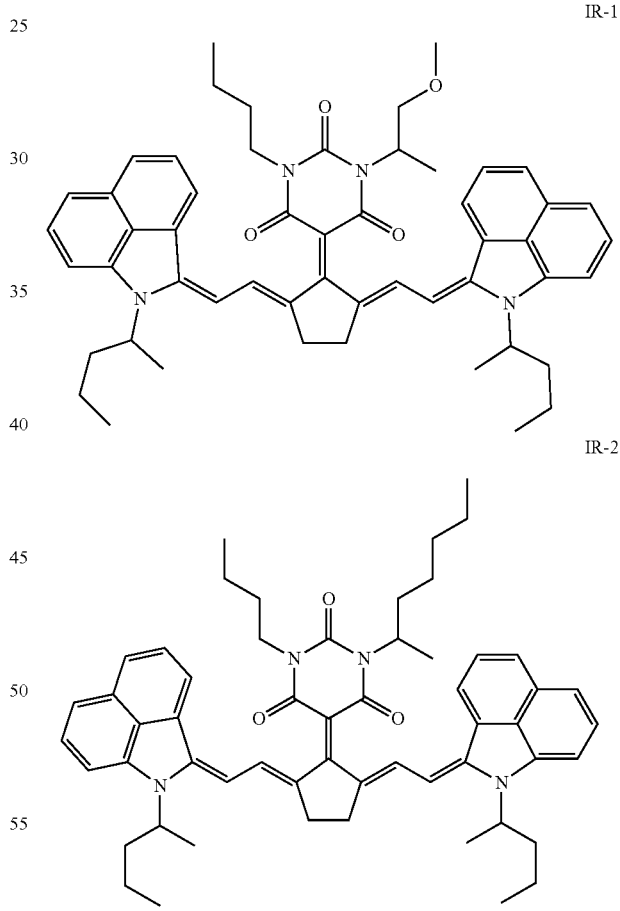

Both IR dyes IR-1 and IR-2 have an absorption maximum $\lambda_{max}$ around 1052 nm making them very suitable for a Nd-YAG laser having an emission wavelength of 1064 nm.

IR dyes having an absorption maximum between 830 nm and 1000 nm are preferably selected from the group consisting of quinoline dyes, indolenine dyes, especially benzo[e]indolenine dyes, and benzo[f]indolenine dyes.

An advantage of using IR dyes is that the absorption spectrum of an IR dye tends to be narrower than that of an IR pigment. This allows the production of multicolour laser markable packaging having a plurality of laser markable layers containing different IR dyes and colour forming compounds. The IR dyes having a different maximum absorption wavelength can then be addressed by IR lasers with corresponding emission wavelengths causing colour formation only in the laser markable layer of the addressed IR dye. Such multicolour articles have been disclosed in for example U.S. Pat. No. 4,720,449, EP-A 2719540 and EP-A 2719541.

The amount of the IR dyes in the offset ink or varnish is preferably between 0.001 and 5 wt %, more preferably between 0.005 and 1 wt %, most preferably between 0.01 and 0.5 wt %, relative to the total weight of the ink or varnish.

The amount of IR dye in the printed and dried offset ink, varnish or dispersion-lacquer is preferably between 0.01 and 1, more preferably between 0.025 and 0.5 wt % relative to the total dry weight of the offset ink, varnish or dispersion-lacquer. Enough IR dye has to be present to ensure sufficient colour density formation upon exposure to IR radiation. However, using too much IR dye may result in unwanted background colouration of the laser markable materials.

As offset inks or varnishes are typically non-aqueous and apolar, preferred IR dyes are soluble in such non-aqueous and apolar media.

A combination of two, three or more IR dyes may be used in a single offset ink or varnish.

Such a combination of IR dyes may be used to optimize the absorption maxima of the offset inks or varnishes.

Also, a mixture of IR dyes may improve the solubility of the IR dyes in the offset ink or varnish.

It has been observed that after printing a laser markable offset ink or varnish, the IR dye may decompose as function of time. To improve the stability of the IR dyes in such non-aqueous and apolar inks or varnishes, the IR dyes may be added as dispersions. It has been observed that such pigment-like IR dyes typically have an improved stability compared to solubilized IR dyes.

Infrared Radiation Absorbing Pigments

A preferred IR pigment is carbon black, such as acetylene black, channel black, furnace black, lamp black, and thermal black. This avoids the use of heavy metals in manufacturing colour laser markable materials. Heavy metals are less desirable from an ecology point of view and may also cause problems for persons having a contact allergy based on heavy metals.

Suitable carbon blacks include Special Black 25, Special Black 55, Special Black 250 and Farbruss™ FW2V all available from EVONIK; Monarch™ 1000 and Monarch™ 1300 available from SEPULCHRE; and Conductex™ 975 Ultra Powder available from COLUMBIAN CHEMICALS CO.

The use of carbon black pigments may lead to an undesired background colouring. For example, a too high concentration of carbon black in a laser markable layer in security document having a white background leads to grey security documents. A too low concentration of carbon black slows down the laser marking or requires a higher laser power.

The numeric average particle size of the carbon black particles is preferably between 5 nm and 250 nm, more preferably between 10 nm and 100 nm and most preferably between 30 nm and 60 nm. The average particle size of carbon black particles can be determined with a Brookhaven Instruments Particle Sizer BI90plus based upon the principle of dynamic light scattering. The measurement settings of the BI90plus are: 5 runs at 23° C., angle of 90°, wavelength of 635 nm and graphics=correction function.

For avoiding grey background colouring of security document, carbon black is preferably present in a concentration of less than 0.08 wt %, more preferably present in a concentration of less than 0.05 wt %, and most preferably present in the range 0.01 to 0.03 wt %, all based on the total weight of the laser markable composition.

As mentioned above, the IR dyes disclosed above may also be used as IR pigments, for example cyanine pigment, merocyanine pigment, etc.

Optothemal converting agents may become "diffusion hindered" by:

including the optothermal converting agent in the core of a capsule composed of a polymeric shell surrounding a core;

linking two or more basic optothermal converting agent to each other whereby the total molecular weight of the resulting compound becomes at least twice the molecular weight of the basic ingredient with the proviso that the total molecular weight is at least 500, more preferably at least 750 and most preferably at least 1000.

By using a diffusion hindered optothermal converting agent, the risk of penetrating through a food or pharmaceutical packaging is minimized. Furthermore, the optothermal converting agent cannot be extracted by moisture, e.g. by sweaty hands, before heat treatment or verification of the authenticity of the packaging.

Capsules

The optothermal converting agent may be become "diffusion hindered" by including the optothermal converting agent in the core of a capsule composed of a polymeric shell surrounding a core.

The preparation and properties of such capsules are similar as for the capsules containing a leuco dye described above.

Multifunctional, Oligomeric and Polymeric Optothermal Converting Agents

Optothermal converting agents may also become diffusion hindered by polymerizing or co-polymerizing the optothermal converting agent to form a polymeric optothermal converting agent or by post derivation of a polymeric resin with an optothermal converting agent.

The preparation and the properties of the polymeric optothermal converting agents are similar as for the polymeric leuco dyes described above.

According to another embodiment, an optothermal converting agent may become diffusion hindered by linking two or more basic optothermal converting agents to each other whereby the total molecular weight becomes at least twice the molecular weight of the basic optothermal converting agent with the proviso that the total molecular weight is at least 500, more preferably at least 750 and most preferably at least 1000.

Typical examples of multifunctional, oligomeric or polymeric optothermal converting agents are given in Table 6 without being limited thereto.

TABLE 6
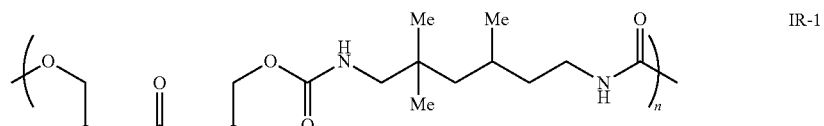
IR-1
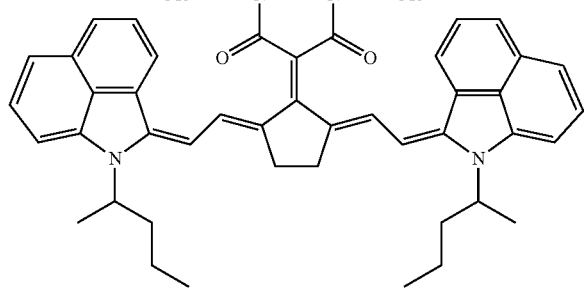
IR-2
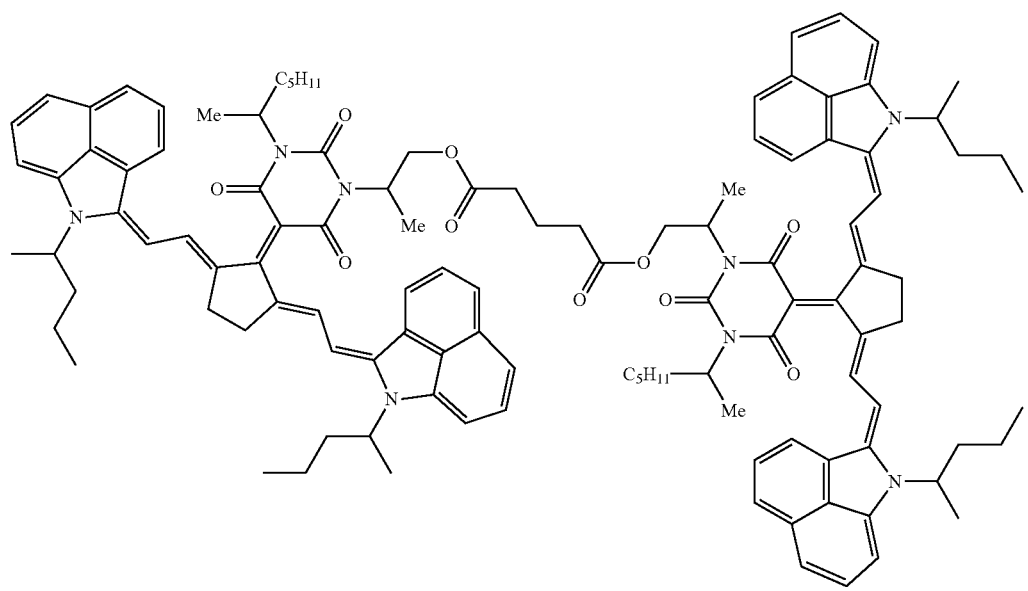
IR-3
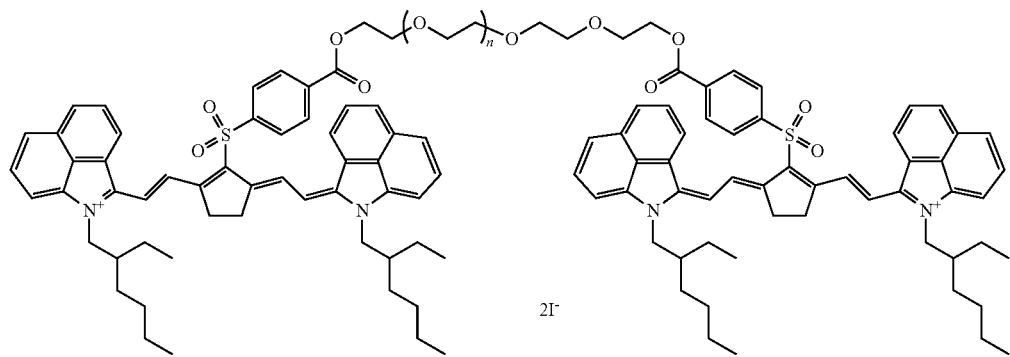

TABLE 6-continued

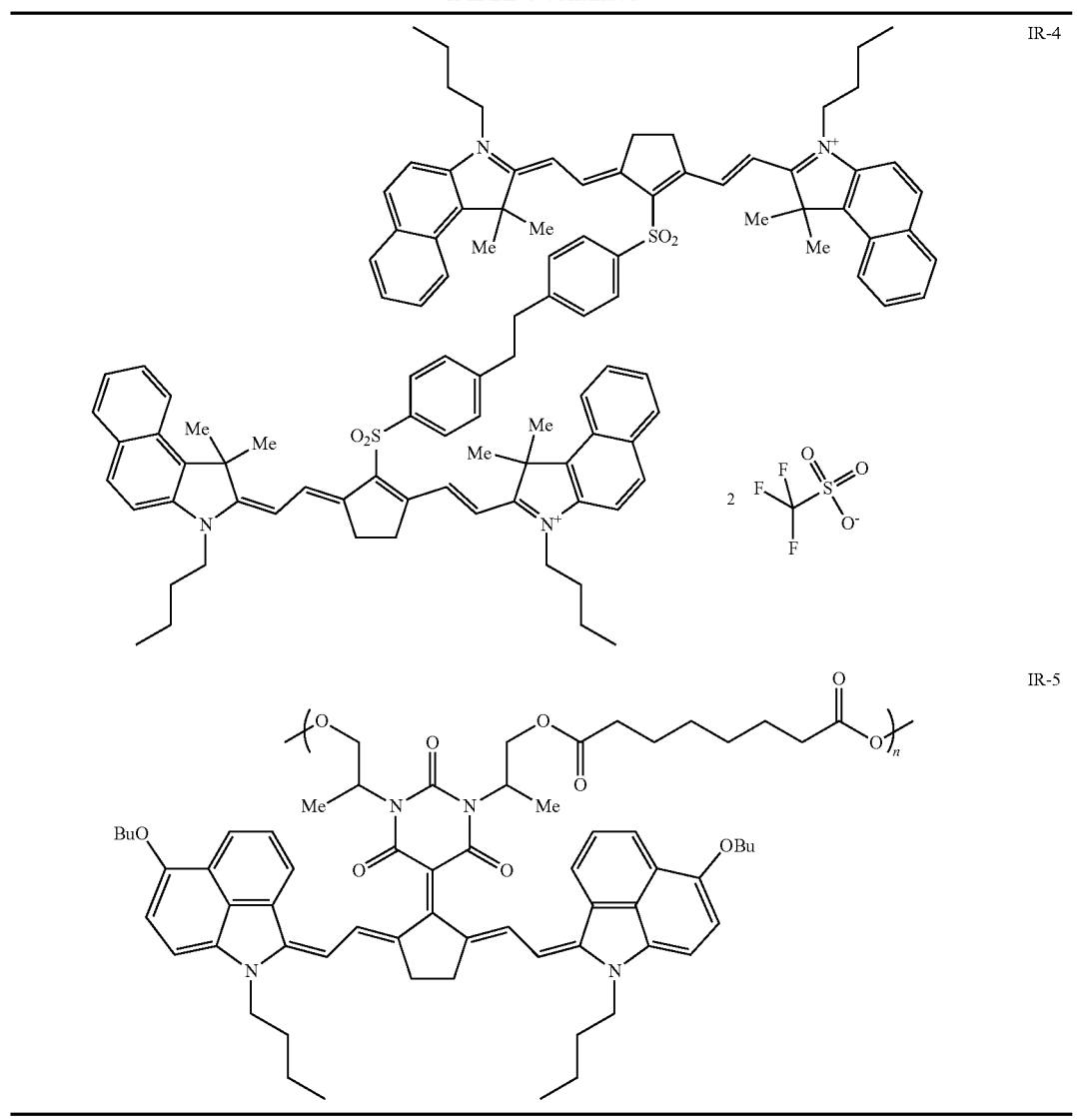

Colour Developing Agent

A colour developing agent is capable of reacting with a colourless leuco dye resulting in the formation of a coloured dye.

Various electron accepting substances may be used as colour developing agent in the present invention. Examples thereof include phenolic compounds, organic or inorganic acidic compounds and esters or salts thereof.

Specific examples include bisphenol A; tetrabromobisphenol A; gallic acid; salicylic acid; 3-isopropyl salicylate; 3-cyclohexyl salicylate; 3-5-di-tert-butyl salicylate; 3,5-di-α-methyl benzyl salicylate; 4,4'-isopropylidenediphenol; 1,1'-isopropylidene bis(2-chlorophenol); 4,4'-isopropylene bis(2,6-dibromo-phenol); 4,4'-isopropylidene bis(2,6-dichlorophenol); 4,4'-isopropylidene bis(2-methyl phenol); 4,4-isopropylidene bis(2,6-dimethyl phenol); 4,4'-isopropylidene bis(2-tert-butyl phenol); 4,4'-sec-butylidene diphenol; 4,4'-cyclohexylidene bisphenol; 4,4'-cyclohexylidene bis(2-methyl phenol); 4-tert-butyl phenol; 4-phenyl phenol; 4-hydroxy diphenoxide; α-naphthol; β-naphthol; 3,5-xylenol; thymol; methyl-4-hydroxybenzoate; 4-hydroxy-acetophenone; novolak phenol resins; 2,2'-thio bis(4,6-dichloro phenol); catechol; resorcin; hydroquinone; pyrogallol; fluoroglycine; fluoroglycine carboxylate; 4-tert-octyl catechol; 2,2'-methylene bis(4-chlorophenol); 2,2'-methylene bis(4-methyl-6-tert-butyl phenol); 2,2'-dihydroxy diphenyl; ethyl p-hydroxybenzoate; propyl p-hydroxybenzoate; butyl p-hydroxy-benzoate; benzyl p-hydroxybenzoate; p-hydroxybenzoate-p-chlorobenzyl; p-hydroxybenzoate-o-chlorobenzyl; p-hydroxybenzoate-p-methylbenzyl; p-hydroxybenzoate-n-octyl; benzoic acid; zinc salicylate; 1-hydroxy-2-naphthoic acid; 2-hydroxy-6-naphthoic acid; 2-hydroxy-6-zinc naphthoate; 4-hydroxy diphenyl sulphone; 4-hydroxy-4'-chloro diphenyl sulfone; bis(4-hydroxy phenyl)sulphide; 2-hydroxy-p-toluic acid; 3,5-di-tert-zinc butyl salicylate; 3,5-di-tert-tin butyl salicylate; tartaric acid; oxalic acid; maleic acid; citric acid; succinic acid; stearic acid; 4-hydroxyphthalic acid; boric acid; thiourea derivatives; 4-hydroxy thiophenol derivatives; bis(4-hydroxyphenyl) acetate; bis(4-hydroxyphenyl)ethyl acetate; bis(4-hydroxyphenyl) acetate-n-propyl; bis(4-hydroxy-phenyl)acetate-n-butyl; bis (4-hydroxyphenyl)phenyl acetate; bis(4-hydroxyphenyl)-benzyl acetate; bis(4-hydroxyphenyl)phenethyl acetate; bis (3-methyl-4-hydroxy-phenyl)acetate; bis(3-methyl-4- hydroxy-phenyl)methyl acetate; bis(3-methyl-4-hydroxyphenyl)acetate-n-propyl; 1,7-bis(4-hydroxyphenylthio)3,5-dioxaheptane; 1,5-bis(4-hydroxyphenylthio)3-oxaheptane; 4-hydroxy phthalate dimethyl; 4-hydroxy-4'-methoxy diphenyl sulfone; 4-hydroxy-4'-ethoxy diphenyl sulfone; 4-hydroxy-4'-isopropoxy diphenyl sulfone; 4-hydroxy-4'-propoxy diphenyl sulfone; 4-hydroxy-4'-butoxy diphenyl sulfone; 4-hydroxy-4'-isopropoxy diphenyl sulfone; 4-hydroxy-4'-sec-butoxy diphenyl sulfone; 4-hydroxy-4'-tert-butoxy diphenyl sulfone; 4-hydroxy-4'-benzyloxy diphenyl sulfone; 4-hydroxy-4'-phenoxy diphenyl sulfone; 4-hydroxy-4'-(m-methyl benzoxy) diphenyl sulfone; 4-hydroxy-4'-(p-methyl benzoxy)diphenyl sulfone; 4-hydroxy-4'-(o-methyl benzoxy)diphenyl sulfone; 4-hydroxy-4'-(p-chloro benzoxy)diphenyl sulfone and 4-hydroxy-4'-oxyaryl diphenyl sulfone.

A preferred colour developing agent is a metal salt of salicylate, for example zinc salicylate. A particularly preferred colour developing agent is zinc 3,5-bis(α-methylbenzyl) salicylate.

Colour Developing Agent Precursor

Also a so-called colour developing agent precursor may be used. Such a precursor forms a colour developing agent upon exposure to heat. Using a colour developing agent precursor instead of a colour developer may result in a better UV and heat stability of the laser markable composition.

The colour developing agent precursor may be present in the continuous phase of the laser markable composition or it may be present in the core of a capsule. However, when the colour developing agent is not, or slightly, soluble in aqueous media, it is preferred to add such a colour developing agent as an aqueous dispersion or emulsion.

All publicly-known thermal acid generators can be used as colour developing agent. Thermal acid generators are for example widely used in conventional photoresist material. For more information see for example Encyclopaedia of polymer science", 4$^{th}$ edition, Wiley or "Industrial Photoinitiators, A Technical Guide", CRC Press 2010.

Preferred classes of photo- and thermal acid generators are iodonium salts, sulfonium salts, ferrocenium salts, sulfonyl oximes, halomethyl triazines, halomethylarylsulfone, α-haloacetophenones, sulfonate esters, t-butyl esters, allyl substituted phenols, t-butyl carbonates, sulfate esters, phosphate esters and phosphonate esters.

Preferred thermal acid generating compounds have a structure according to Formula (I) or Formula (II):

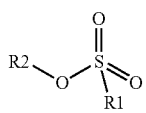

Formula I

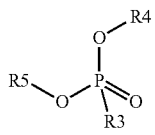

Formula II wherein
R1 and R3 independently represent an optionally substituted alkyl group, an optionally substituted (hetero)cyclic alkyl group, an optionally substituted alkanyl group, an optionally substituted alkenyl group, an optionally substituted alkynyl group, an optionally substituted (hetero)aryl group, an optionally substituted aralkyl group, an optionally substituted alkoxy group, an optionally substituted (hetero)cyclic alkoxy group, or an optionally substituted (hetero)aryloxy group. R2, R4 and R5 independently represent an optionally substituted alkyl, an optionally substituted aliphatic (hetero)cyclic alkyl group or an optionally substituted aralkyl group; R1 and R2, R4 and R5, R3 and R4, and R3 and R5 may represent the necessary atoms to form a ring.

Suitable alkyl groups include 1 or more carbon atoms such as for example $C_1$ to $C_{22}$-alkyl groups, more preferably $C_1$ to $C_{12}$-alkyl groups and most preferably $C_1$ to $C_6$-alkyl groups. The alkyl group may be linear or branched such as for example methyl, ethyl, propyl (n-propyl, isopropyl), butyl (n-butyl, isobutyl, t-butyl), pentyl, 1,1-dimethyl-propyl, 2,2-dimethylpropyl and 2-methyl-butyl, or hexyl.

Suitable cyclic alkyl groups include cyclopentyl, cyclohexyl or adamantyl.

Suitable heterocyclic alkyl groups include tetrahydrofuryl, piperidinyl, pyrrolidinyl, dioxyl, tetrahydrothiophenyl, silolanyl, or thianyl oxanyl.

Suitable aryl groups include for example phenyl, naphthyl, benzyl, tolyl, ortho- meta- or para-xylyl, anthracenyl or phenanthrenyl.

Suitable heteroaryl groups include monocyclic- or polycyclic aromatic rings comprising carbon atoms and one or more heteroatoms in the ring structure. Preferably 1 to 4 heteroatoms independently selected from nitrogen, oxygen, selenium and sulphur and/or combinations thereof. Examples include pyridyl, pyrimidyl, pyrazoyl, triazinyl, imidazolyl, (1,2,3,)- and (1,2,4)-triazolyl, tetrazolyl, furyl, thienyl, isoxazolyl, thiazolyl and carbazoyl.

Suitable alkoxy groups include those containing from 1 to 18, preferably 2 to 8 carbon atoms, such as ethoxide, propoxide, isopropoxide, butoxide, isobutoxide and tert-butoxide.

Suitable aryloxy groups include phenoxy and naphthoxy.

The alkyl, (hetero)cyclic alkyl, aralkyl, (hetero)aryl, alkoxy, (hetero)cyclic alkoxy, or (hetero)aryloxy groups may include one or more substituents. The optional substituents are preferably selected from an alkyl group such as a methyl, ethyl, n-propyl, isopropyl, n-butyl, 1-isobutyl, 2-isobutyl and tertiary-butyl group; an ester, amide, ether, thioether, ketone, aldehyde, sulfoxide, sulfone, sulfonate ester or sulfonamide group, a halogen such as fluorine, chlorine, bromine or iodine, —OH, —SH, —CN and —NO$_2$, and/or combinations thereof.

R1 preferably represents a $C_1$ to $C_{22}$-alkyl group, an aliphatic alkoxide group containing 2 to 8 carbons, a phenyl group or a tolyl group. R1 most preferably represents a tolyl group.

R2 preferably represents a $C_1$ to $C_{22}$-alkyl group or a (hetero)cyclic alkyl group. R2 most preferably represents a cyclohexyl group.

R3 preferably represents a $C_1$ to $C_{22}$-alkyl group, an aliphatic alkoxide group containing 2 to 8 carbons or a benzyl group.

In a preferred embodiment, R4 and R5 independently represent a $C_1$ to $C_{22}$-alkyl group. In a preferred embodiment, R4 and R5 represent independently an isobutyl, t-butyl, isopropyl, 2-ethylhexyl or a linear $C_2$ to $C_8$-alkyl group.

The compound used in the present invention can be a monomer, an oligomer (i.e. a structure including a limited amount of monomers such as two, three or four repeating units) or a polymer (i.e. a structure including more than four repeating units).

The compound used in the present invention contains at least one moiety according to Formula I and/or Formula II, preferably 1 to 150 moieties according to Formula I and/or Formula II. According to a preferred embodiment, the compound according to Formula I or Formula II may be present in a side chain of a polymer.

In the embodiment wherein the compound according to Formula I or Formula II is present in the side chain of a polymer, the following moiety (Formula III, IV or V) is preferably attached to the polymer:

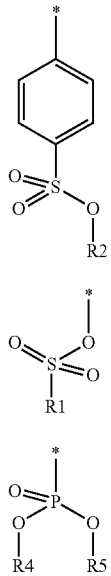

Formula III

Formula IV

Formula V wherein

* denotes the linking to the polymer and

R1, R2, R4 and R5 as described above.

In the embodiment wherein the compound according to Formula I is present in the side chain of a polymer, the polymer is more preferably obtained from the coupling of a polymer or copolymer bearing side chains with alcohol groups and a sulfonyl chloride.

In the embodiment wherein the compound according to Formula I is present in the side chain of a polymer, the polymer is most preferably obtained from the coupling of a polymer or copolymer bearing side chains with alcohol groups and tosyl chloride. Useful polymers bearing side chains with alcohol include for example polyvinyl alcohol, polyvinyl butyral, cellulose derivatives, homo- and copolymers of 2-hydroxyethyl methacrylate, 2-hydroxyethyl acrylate, polysiloxane derivatives such as copolymers of hydroxyalkyl-methylsiloxane, and novolac resins.

Examples of acid generating compounds according to the present invention are shown in Table 7.

TABLE 7

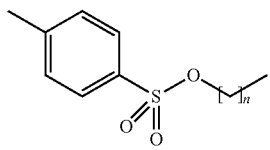

with n = 1-50

TABLE 7-continued

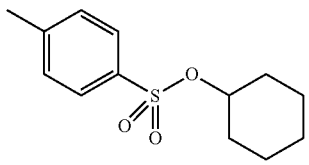 [SMILES: Cc1ccc(S(=O)(=O)OC2CCCCC2)cc1]

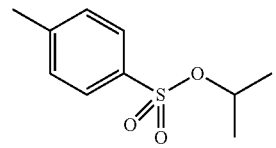

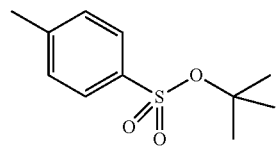

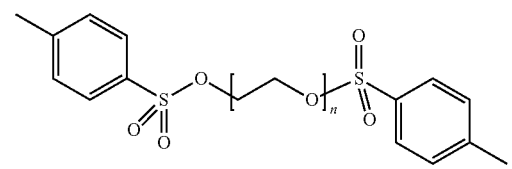

with n = 1-10000

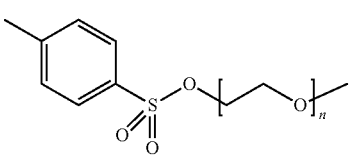

with n = 1-10000

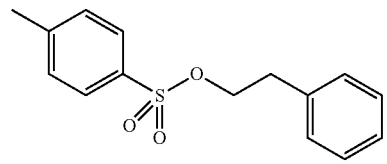 [SMILES: Cc1ccc(S(=O)(=O)OCCc2ccccc2)cc1]

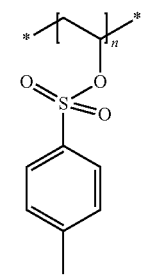

with n = 1-10000 and copolymers thereof

TABLE 7-continued
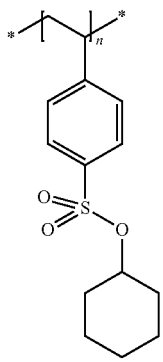
with n = 1-10000 and copolymers thereof
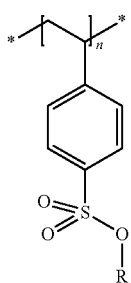
with n = 1-10000 and copolymers thereof
and R representing an alkyl group,
preferably a tertiary butyl group
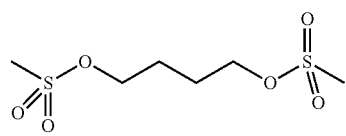
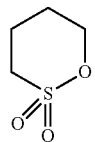
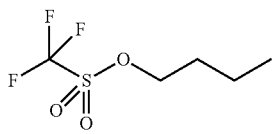
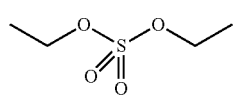
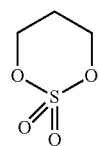
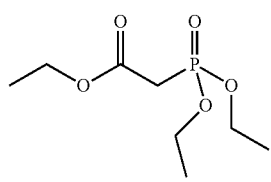
TABLE 7-continued
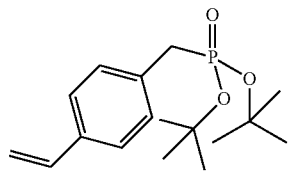 [SMILES: C=Cc1ccc(CP(=O)(OC(C)(C)C)OC(C)(C)C)cc1]
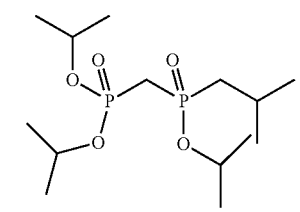 [SMILES: CC(C)CP(=O)(CP(=O)(OC(C)C)OC(C)C)OC(C)C]
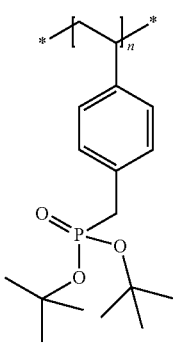
with n = 1-10000 and copolymers thereof
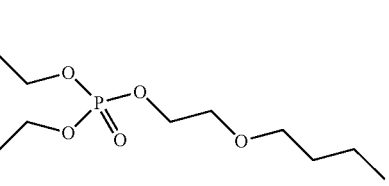
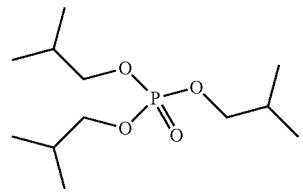 [SMILES: CC(C)COP(=O)(OCC(C)C)OCC(C)C]
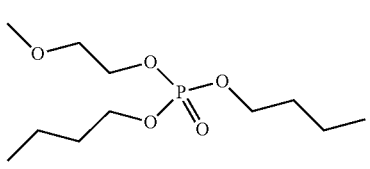 [SMILES: CCCCOP(=O)(OCCCC)OCCOC]

TABLE 7-continued

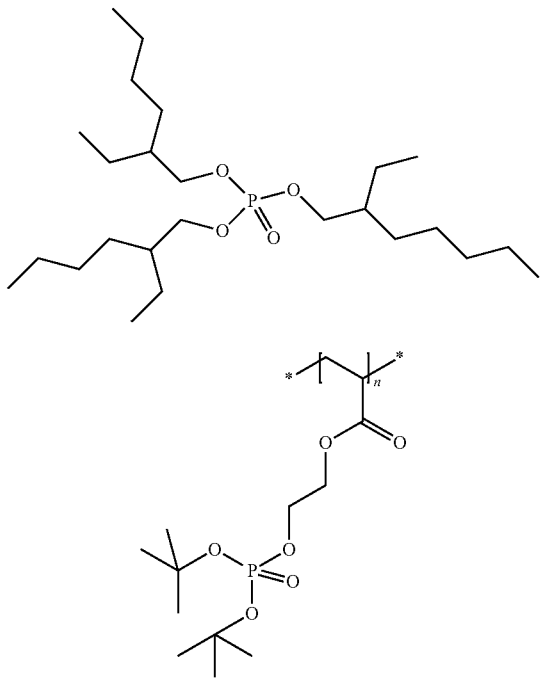

with n = 1-10000 and copolymers thereof

Other classes of photo- and thermal acid generators are iodonium salts, sulfonium salts, ferrocenium salts, sulfonyl oximes, halomethyl triazines, halomethyl-arylsulfone, α-haloacetophenones, sulfonate esters, t-butyl esters, allyl substituted phenols, t-butyl carbonates, sulfate esters, phosphate esters and phosphonate esters.

Colour developing agents or colour developing agent precursors may become "diffusion hindered" by:
  including the colour developing agent or colour developing agent precursor in the core of a capsule composed of a polymeric shell surrounding a core;
  polymerizing or co-polymerizing the colour developing agent or colour developing agent to form a polymeric colour developing agent or colour developing agent; or
  linking two or more basic colour developing agent or colour developing agent precursor to each other whereby the total molecular weight of the resulting compound becomes at least twice the molecular weight of the basic ingredient with the proviso that the total molecular weight is at least 500, more preferably at least 750 and most preferably at least 1000.

By using a diffusion hindered colour developing agent or colour developing agent, the risk of penetrating through a food or pharmaceutical packaging is minimized. Furthermore, the leuco dye cannot be extracted by moisture, e.g. by sweaty hands, before heat treatment or verification of the authenticity of the packaging.

Capsules

The colour developing agent or colour developing agent precursor may be become "diffusion hindered" by including the leuco dye in the core of a capsule composed of a polymeric shell surrounding a core.

The preparation and properties of such capsules are similar as for the capsules containing a leuco dye described above.

Polymeric Colour Developing Agent or Colour Developing Agent Precursor

Colour developing agents or colour developing agents precursors may also become diffusion hindered by polymerizing or co-polymerizing the colour developing agent or colour developing agent precursor to form a polymeric leuco dye or by post derivation of a polymeric resin with the colour developing agent or colour developing agent precursor.

The preparation and the properties of the polymeric colour developing agent or colour developing agent precursor are similar as for the polymeric leuco dyes described above.

Typical polymeric and oligomeric colour developing agent or colour developing agent precursor are given in Table 8 without being limited thereto.

TABLE 8

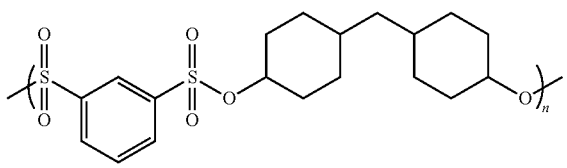

Polydev-1

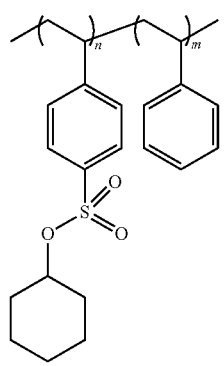

Polydev-2

TABLE 8-continued
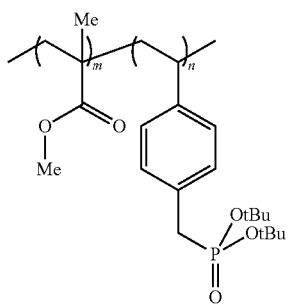
Polydev-3
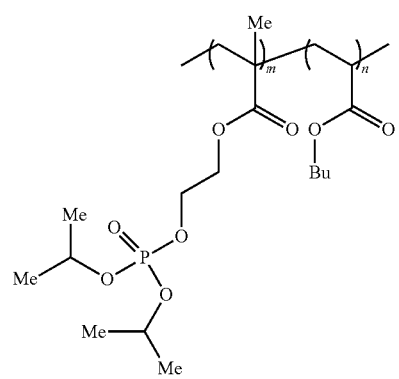
Polydev-4
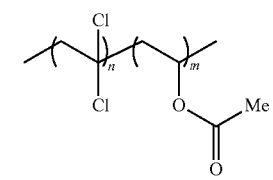
Polydev-5
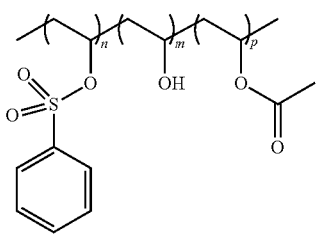
Polydev-6
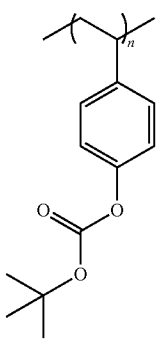
Polydev-7

TABLE 8-continued

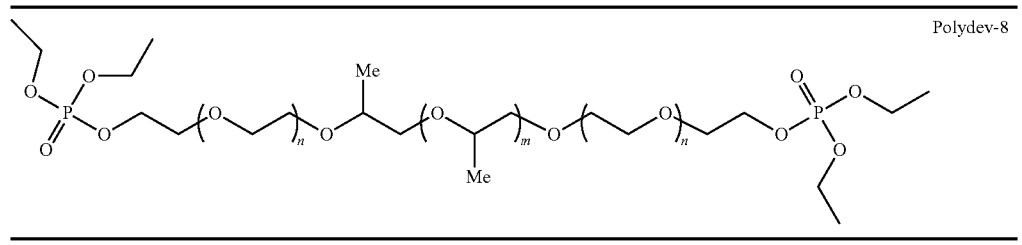

Polydev-8

According to preferred embodiment of the invention, the colour developing agent precursor is a polymeric leuco dye capable of forming an acid upon exposure to heat.

The acid liberated upon exposure to heat within the meaning of the invention includes Arrhenius acids, Brønsted-Lowry acids, and Lewis acids.

The polymer particles comprise repeating units, which are capable of generating an acid upon exposure to heat. Typically, exposure to heat may cause a fragmentation reaction resulting in an acid formation. The resulting acid may be a low molecular weight molecule formed by the fragmentation reaction or the acid may reside on the polymer particle after a fragmentation reaction. Table 9 depicts (part of) polymeric acid precursors, more specific the repeating unit that is able to generate an acid upon thermal treatment.

TABLE 9

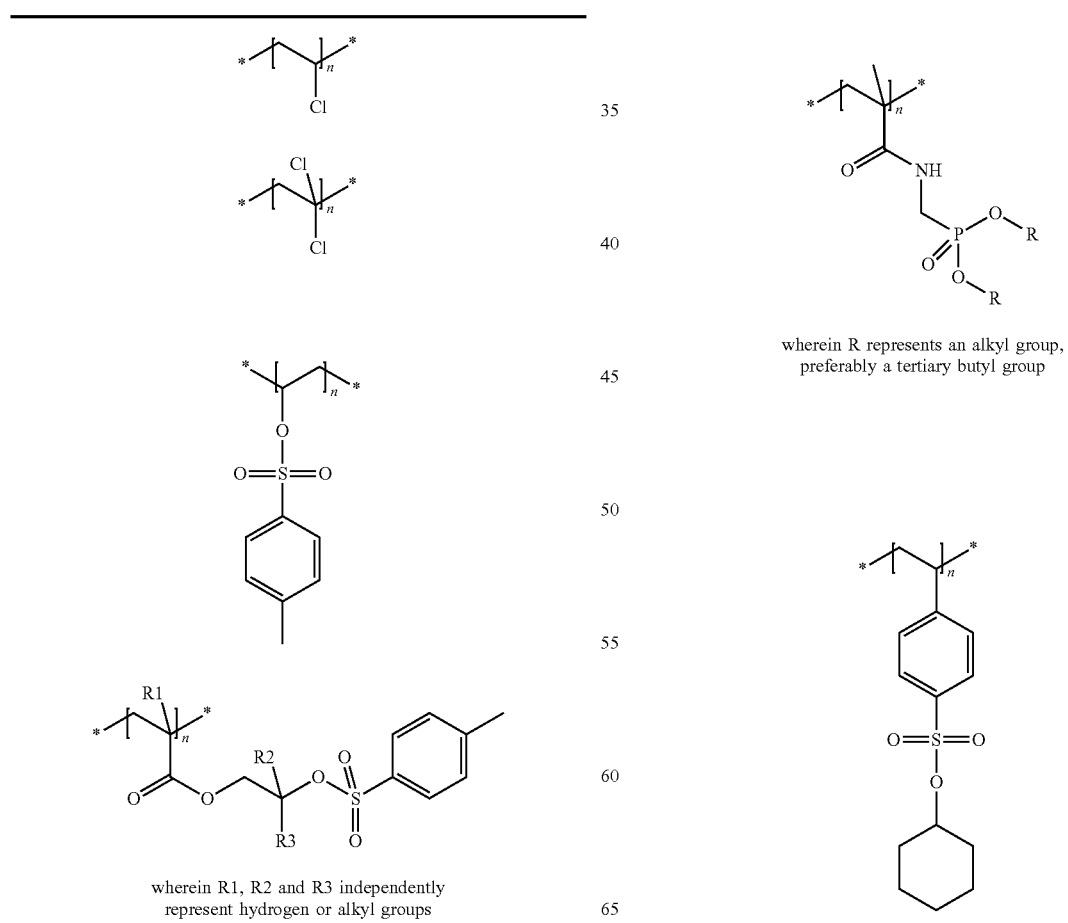

wherein R1, R2 and R3 independently represent hydrogen or alkyl groups wherein R represents an alkyl group, preferably a tertiary butyl group wherein R represents an alkyl group, preferably a tertiary butyl group

TABLE 9-continued

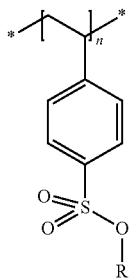

wherein R represents an alkyl group,
preferably a tertiary butyl group

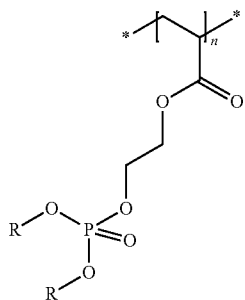

wherein R represents an alkyl group,
preferably a tertiary butyl group

Preferred polymeric particles are capable of releasing a low molecular weight acid.

A particularly preferred polymer particle is a polyvinylidenechloride (PVDC) polymer particle. Upon exposure to heat, such a polymer particle is capable of releasing HCl.

The polyvinylidenechloride (PVDC) particle is preferably a vinylidene chloride copolymer comprising 90 wt % or less of vinylidene chloride based on the total weight of the binder.

When the amount of vinylidene chloride is above 90 wt % based on the total weight of the binder, the crystallinity of the binder becomes too high resulting in poor film forming property. Copolymerizaton of vinylidene chloride with further monomers renders the copolymer more amorphous and thus more soluble in the liquid carrier.

The vinylidene chloride copolymer preferably comprises a further monomer selected from the group consisting of vinyl chloride, alkyl acrylate, alkyl methacrylate, vinylether, vinylacetate, vinyl alcohol, acrylonitrile, methacrylonitrile, maleic acid, maleic anhydride, itaconic acid.

The vinylidene chloride copolymer more preferably comprises a further monomer selected from the group consisting of vinyl chloride, acrylonitrile, maleci acid, maleic anhydride and an alkyl acrylate.

The alkyl acrylate and alkyl methacrylate referred to above is preferably a C1-C10 alkyl acrylate or methacrylate. Particular preferred alkyl acrylates or alkyl methacrylates are methyl and butyl acrylate or methyl and butyl methacrylate.

Water based vinylidene copolymers may also be used in the present invention. Examples of such copolymers are Daran®8730, Daran®8550, Daran®SL112, Daran®SL143, Daran®SL159 or Daran®8100, all commercially available from Owensboro Specialty Polymers; Diofan®193D, Diofan®P520, Diofan®P530 all commercially available from Solvay.

A PVDC copolymer may be characterized by the so-called dehydrochlorination constant (DHC). The amount of HCl liberated by a specific PVDC copolymer at a specified temperature during a specific time is measured.

The amount of polymer particle in the laser markable composition is preferably between 5 and 75 wt %, more preferably between 7.5 and 50 wt %, most preferably between 10 and 40 wt %, relative to the total weight of the laser markable composition. After applying and drying the composition on a support, the amount of polymer particles is preferably between 50 and 95 wt %, more preferably between 65 and 90 wt %, most preferably between 75 and 85 wt %, relative to the total dry weight of the laser markable composition.

Multifunctional Colour Developing Agents or Colour Developing Agent Precursors.

According to another embodiment, a colour developing agent or colour developing agent precursor may become diffusion hindered by linking two or more basic colour developing agent or colour developing agent precursor to each other whereby the total molecular weight becomes at least twice the molecular weight of the basic leuco dye with the proviso that the total molecular weight is at least 500, more preferably at least 750 and most preferably at least 1000.

Typical di- and multifunctional colour developing agent or colour developing agent precursor are given in Table 10 without being limited thereto.

TABLE 10

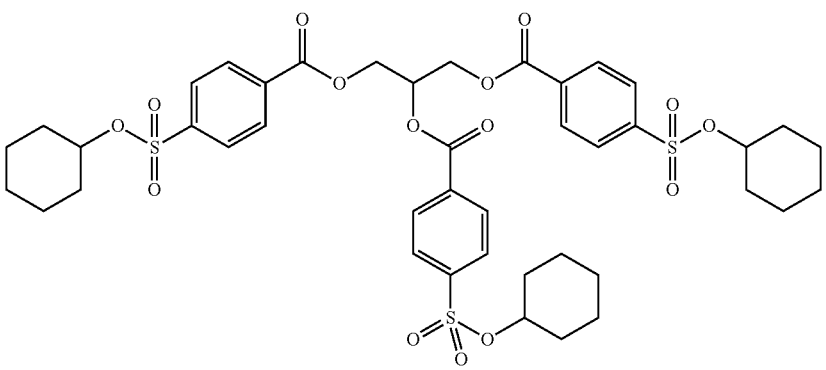 [SMILES: O=C(OCC(COC(=O)c1ccc(S(=O)(=O)OC2CCCCC2)cc1)OC(=O)c1ccc(S(=O)(=O)OC2CCCCC2)cc1)c1ccc(S(=O)(=O)OC2CCCCC2)cc1]

Multidev-1

TABLE 10-continued

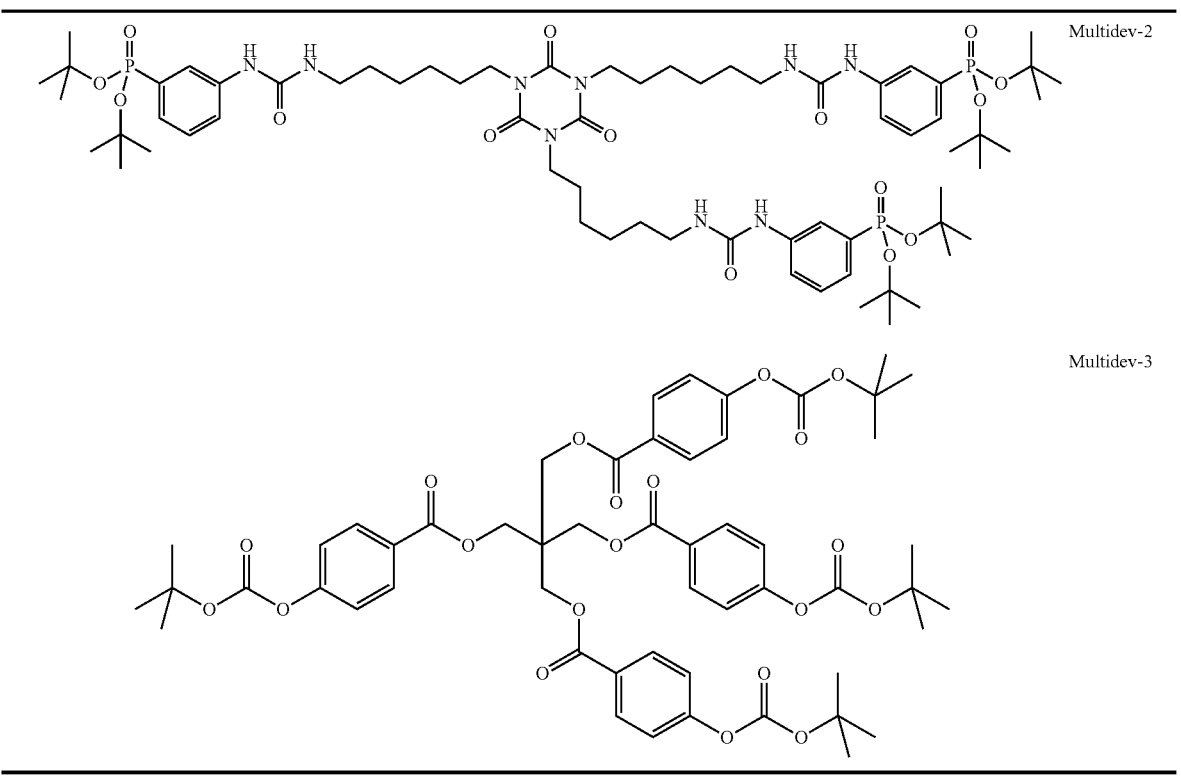

Multidev-2

Multidev-3

Polymerisable Colour Developing Agents or Colour Developing Agent Precursors.

In the embodiment wherein a UV curable composition, for example a UV curable inkjet ink, a polymerisable colour developing agent or colour developing agent precursor, is preferably used.

Upon UV curing the composition, the colour developing agent or colour developing agent precursor are copolymerized together with the other monomers of the composition. As part of the resulting polymeric network, the colour developing agent or colour developing agent precursor also become diffusion hindered.

Typical polymerisable colour developing agent or colour developing agent precursor are given in Table 11 without being limited thereto.

TABLE 11

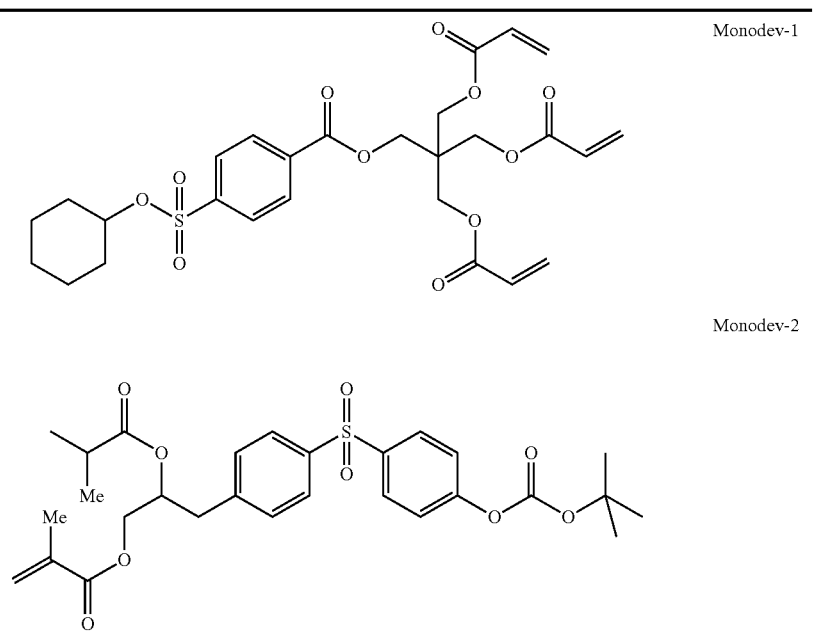

Monodev-1

Monodev-2

TABLE 11-continued

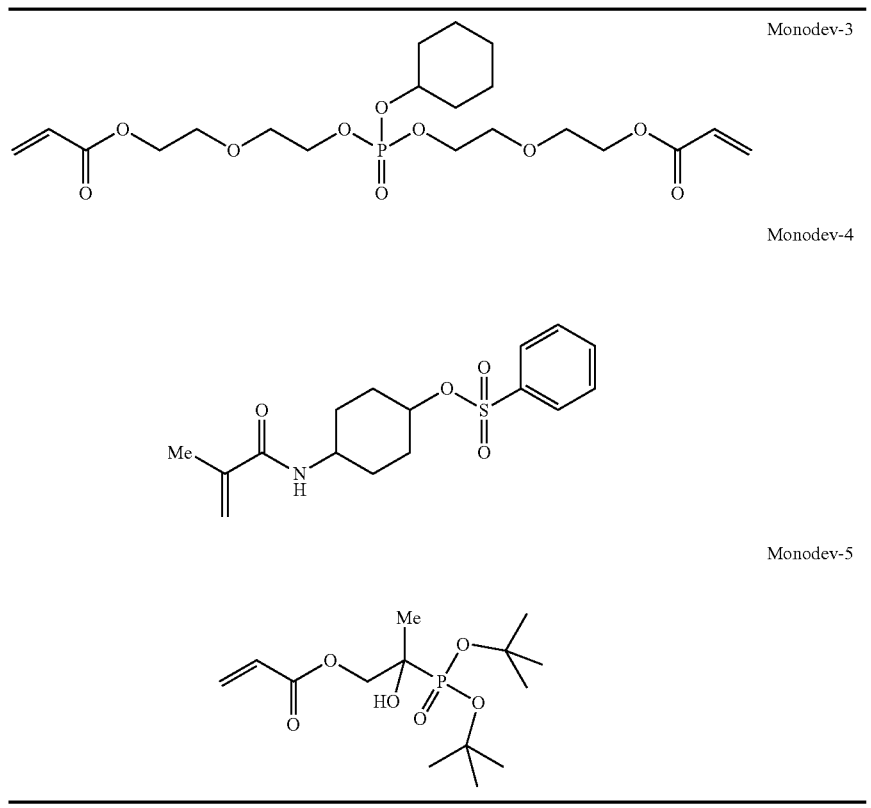

Compounds Containing a Leuco Dye and a Colour Developing Agent (Precursor)

In a particularly preferred embodiment, a diffusion hindered leuco dye and an diffusion hindered colour developing agent or colour developing agent precursor are integrated into the same multifunctional, polymeric or oligomeric structure to guarantee close proximity of the colour developing agent or colour developing agent precursor and the leuco dye.

Such compounds may be prepared by copolymerisation of polymerisable leuco dyes, polymerisable colour developing agents or colour developing agent precursors, by post-derivatisation of a polymeric leuco polymer with a reactive colour developing agent or colour developing agent precursor, by post-derivatisation of a polymeric colour developing agent or colour developing agent precursor polymer with a reactive leuco dye, or by polycondensation of a reactive leuco dye and a reactive colour developing agent or colour developing agent precursor.

Typical examples of such leuco dye—colour developing agent precursor copolymers are given in Table 12 without being limited thereto.

TABLE 12

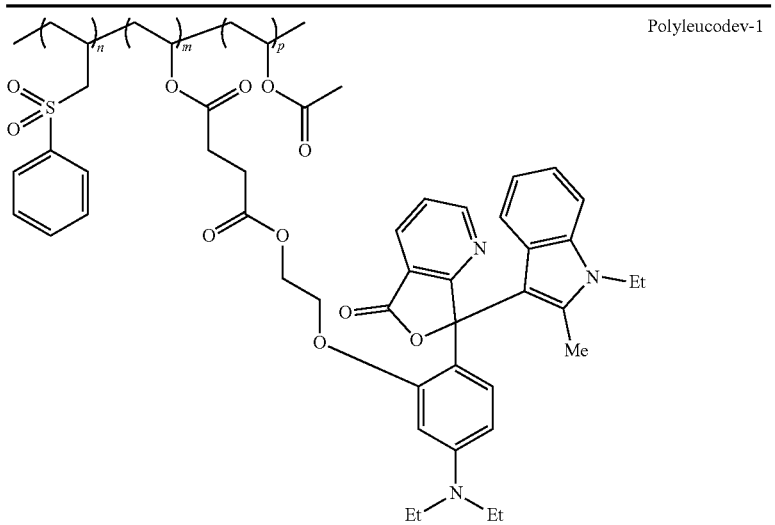

TABLE 12-continued

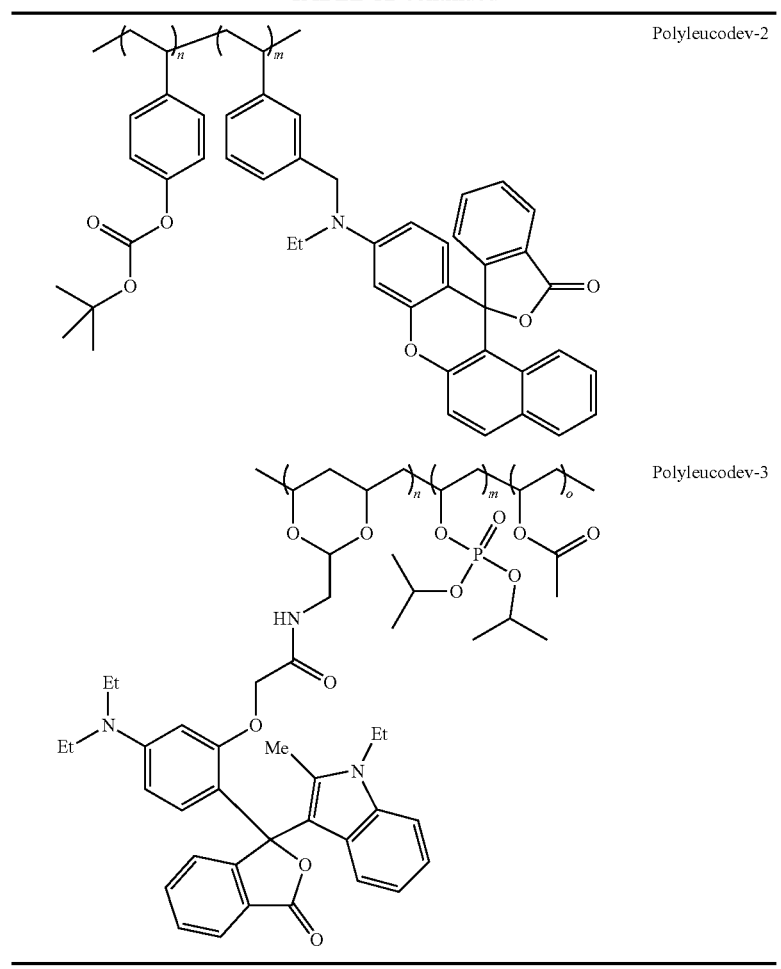

Acid Scavenger

The laser markable composition may contain one or more acid scavengers.

Acid scavengers include organic or inorganic bases.

Examples of the inorganic bases include hydroxides of alkali metals or alkaline earth metals; secondary or tertiary phosphates, borates, carbonates; quinolinates and metaborates of alkali metals or alkaline earth metals; a combination of zinc hydroxide or zinc oxide and a chelating agent (e.g., sodium picolinate); hydrotalcite such as Hycite 713 from Clariant; ammonium hydroxide; hydroxides of quaternary alkylammoniums; and hydroxides of other metals.

Examples of the organic bases include aliphatic amines (e.g., trialkylamines, hydroxylamines and aliphatic polyamines); aromatic amines (e.g., N-alkyl-substituted aromatic amines, N-hydroxylalkyl-substituted aromatic amines and bis[p-(dialkylamino)phenyl]-methanes), heterocyclic amines, amidines, cyclic amidines, guanidines and cyclic guanidines.

Other preferred acid scavengers are HALS compounds. Example of suitable HALS include Tinuvin™ 292, Tinuvin™ 123, Tinuvin™ 1198, Tinuvin™ 1198 L, Tinuvin™ 144, Tinuvin™ 152, Tinuvin™ 292, Tinuvin™ 292 HP, Tinuvin™ 5100, Tinuvin™ 622 SF, Tinuvin™ 770 DF, Chimassorb™ 2020 FDL, Chimassorb™ 944 LD from BASF; Hostavin 3051, Hostavin 3050, Hostavin N 30, Hostavin N321, Hostavin N 845 PP, Hostavin PR 31 from Clariant.

Further examples of acid scavengers are salts of weak organic acids such as carboxylates (e.g. calcium stearate).

A preferred acid scavenger is an organic base, more preferably an amine. A particular preferred acid scavenger is an organic base having a pKb of less than 7.

UV Absorbers

The laser markable composition may also comprise an UV-absorber. The UV-absorber is however preferably present in a protective layer, provided on top of the printed laser markable image.

Examples of suitable UV-absorbers include 2-hydroxyphenyl-benzophenones (BP) such as Chimassorb™ 81 and Chimassorb™ 90 from BASF; 2-(2-hydroxyphenyl)-benzotriazoles (BTZ) such as Tinuvin™ 109, Tinuvin™ 1130, Tinuvin™ 171, Tinuvin™ 326, Tinuvin™ 328, Tinuvin™ 384-2, Tinuvin™ 99-2, Tinuvin™ 900, Tinuvin™ 928, Tinuvin™ Carboprotect™, Tinuvin™ 360, Tinuvin™ 1130, Tinuvin™ 327, Tinuvin™ 350, Tinuvin™ 234 from BASF, Mixxim™ BB/100 from FAIRMOUNT, Chiguard 5530 from Chitec; 2-hydroxy-phenyl-s-triazines (HPT) such as Tinuvin™ 460, Tinuvin™ 400, Tinuvin™ 405, Tinuvin™ 477, Tinuvin™ 479, Tinuvin™ 1577 ED, Tinuvin™ 1600 from BASF, 2-(2,4-dihydroxyphenyl)-4,6-bis-(2,4-dimethylphenyl)-s-triazine (CASRN1668-53-7) from Capot Chemical Ltd and 4-[4,6-bis(2-methyl-phenoxy)-1,3,5-triazin-2-yl]-1,3-benzenediol (CASRN13413-61-1); titanium dioxide such as Solasorb 100F from from Croda Chemicals;

zink oxide such as Solasorb 200F from Croda Chemicals; benzoxazines such as Cyasorb UV-3638 F, CYASORB™ UV-1164 from CYTEC; and oxamides such as Sanduvor VSU from Clariant.

Preferred UV absorbers have in the wavelength region between 300 and 400 nm a maximum absorption above 330 nm, more preferably above 350 nm.

Particular preferred UV absorbers are hydroxyphenyl benzotriazoles and 2-hydroxyphenyl-s-triazines having a maximum absorption above 350 nm in the wavelength region 300-400 nm.

The invention claimed is:

1. A method of producing a 2D barcode on an article including a laser markable layer, the 2D barcode including a primary information pattern representing primary information and a secondary information pattern embedded within the 2D barcode, the method comprising:
   laser marking by exposing the laser markable layer with an infrared laser to form the secondary information pattern of the 2D barcode; wherein
   the primary information is able to be read by a 2D barcode reader and the secondary information pattern is altered when copied or reproduced and the secondary information pattern consists of elementary sub-cells smaller than 50 µm.

2. The method according to claim 1, wherein the article is packaging or a label.

3. The method according to claim 1, wherein the primary information pattern of the 2D barcode is also formed in the step of laser marking.

4. The method according to claim 1, wherein the secondary information pattern includes a signature.

5. The method according to claim 4, wherein the primary information includes information on a location of the signature in the secondary information pattern.

6. The method according to claim 4, wherein the infrared laser has an emission wavelength between 800 nm and 2000 nm.

7. The method according to claim 1, wherein the laser markable layer includes an optothermal converting agent and a leuco dye.

8. The method according to claim 1, further comprising the step of:
   applying the laser markable layer on the article by flexographic printing or offset printing.

9. The method according to claim 1, wherein the secondary information pattern consists of elementary sub-cells smaller than 20 pm.

10. The method according to claim 9, wherein the elementary sub-cells include multiple gray values.

11. The method according to claim 9, wherein the elementary sub-cells have different colors.

12. A method of authenticating an article comprising the steps of:
   producing the 2D barcode on the article using the method according to claim 1;
   reading the 2D barcode with the 2D barcode reader;
   identifying within the secondary information of the 2D barcode a signature defining a detected signature;
   comparing the detected signature to a signature key and determining as a result of the step of comparing a signature similarity score;
   comparing the signature similarity score to a predetermined signature threshold; and
   establishing an authentication signature result as a success if the signature similarity score is equal to or more than the predetermined signature threshold, or as a failure if the signature similarity score is less than the predetermined signature threshold.

13. The method according to claim 12, wherein the 2D barcode reader is included in a mobile device.

14. The method according to claim 13, wherein the signature key is stored on the mobile device.

15. The method according to claim 13, wherein the mobile device is connected to a remote device on which the signature key is stored, and the authentication signature result is established on the remote device and sent back to the mobile device.

* * * * *